United States Patent
Ferrandini et al.

(10) Patent No.: US 12,210,355 B2
(45) Date of Patent: Jan. 28, 2025

(54) ENHANCED UNMANNED AERIAL VEHICLE FLIGHT WITH SITUATIONAL AWARENESS FOR MOVING VESSELS

(71) Applicant: Skydio, Inc., Redwood City, CA (US)

(72) Inventors: James Anthony Ferrandini, San Rafael, CA (US); Jeremy Christopher Crowley, Redwood City, CA (US); Kristen Marie Holtz, Menlo Park, CA (US)

(73) Assignee: Skydio, Inc., San Mateo, CA (US)

(*) Notice: Subject to any disclaimer, the term of this patent is extended or adjusted under 35 U.S.C. 154(b) by 227 days.

(21) Appl. No.: 17/747,142

(22) Filed: May 18, 2022

(65) Prior Publication Data

US 2023/0259145 A1 Aug. 17, 2023

Related U.S. Application Data

(60) Provisional application No. 63/310,338, filed on Feb. 15, 2022.

(51) Int. Cl.
*G05D 1/06* (2006.01)
*B64C 39/02* (2023.01)
(Continued)

(52) U.S. Cl.
CPC ......... *G05D 1/0646* (2013.01); *B64C 39/024* (2013.01); *G05D 1/106* (2019.05);
(Continued)

(58) Field of Classification Search
CPC ...... G05D 1/0646; G05D 1/106; G05D 1/102; B64C 39/024; H04W 4/021; B64U 50/00;
(Continued)

(56) References Cited

U.S. PATENT DOCUMENTS

2015/0134143 A1 5/2015 Willenborg
2015/0205301 A1* 7/2015 Gilmore ............... G05D 1/0094
701/11
(Continued)

FOREIGN PATENT DOCUMENTS

WO 2014/200604 A2 12/2014
WO WO-2022027596 A1 * 2/2022

OTHER PUBLICATIONS

Machine Translation: WO-2022027596-A1 (Year: 2022).*
International Application No. PCT/US2023/062573, International Search Report, Written Opinion, 15 pages, May 11, 2023.

*Primary Examiner* — Anne Marie Antonucci
*Assistant Examiner* — Connor L Knight

(57) ABSTRACT

An unmanned aerial vehicle (UAV) comprises a flight control system and an electromechanical system directed by the flight control system. The flight control system is configured to track a position of a beacon that is in motion and monitor a difference between an actual position of the unmanned aerial vehicle and a desired position of the unmanned aerial vehicle relative to the position of the beacon. The flight control system configures one or more flight objectives based on one or more factors comprising whether the difference between the actual position and the desired position exceeds a threshold, wherein the flight objectives comprise a velocity objective and a position objective. The flight control system also commands the electromechanical system based at least on the one or more flight objectives.

20 Claims, 11 Drawing Sheets

(51) Int. Cl.
    *G05D 1/00*         (2006.01)
    *G05D 1/10*         (2006.01)
    *H04W 4/021*       (2018.01)
    *B64U 50/00*        (2023.01)

(52) U.S. Cl.
    CPC ............ *H04W 4/021* (2013.01); *B64U 50/00* (2023.01); *B64U 2201/20* (2023.01)

(58) Field of Classification Search
    CPC ............ B64U 2201/20; B64U 2201/00; B64U 2201/10
    See application file for complete search history.

(56) References Cited

U.S. PATENT DOCUMENTS

| | | | |
|---|---|---|---|
| 2016/0304198 A1* | 10/2016 | Jourdan | G05D 1/042 |
| 2017/0038781 A1* | 2/2017 | Querejeta Masaveu | B64U 40/00 |
| 2017/0371353 A1* | 12/2017 | Millinger, III | G01S 19/15 |
| 2019/0187297 A1* | 6/2019 | Li | G01S 19/49 |
| 2019/0196476 A1* | 6/2019 | Matsuda | B64U 30/26 |
| 2022/0137629 A1* | 5/2022 | Lee | B62D 15/021 |
| | | | 701/23 |

\* cited by examiner

OVERHEAD VIEW

SIDE VIEW

OVERHEAD VIEW

ENHANCED UNMANNED AERIAL VEHICLE FLIGHT WITH SITUATIONAL AWARENESS FOR MOVING VESSELS

CROSS-REFERENCE TO RELATED APPLICATION

The present application claims priority to U.S. Provisional Patent Application No. 63/310,338 entitled "ENHANCED SITUATIONAL AWARENESS FOR MOVING VESSELS" filed on Feb. 15, 2022. The prior application is hereby incorporated herein by reference in its entirety.

TECHNICAL FIELD

Various implementations of the present technology relate to unmanned aerial vehicles (UAVs) and, in particular, to enhanced UAV flight with situational awareness for moving vessels.

BACKGROUND

Unmanned aerial vehicles (UAVs) or drones are commonly used to capture video, images, or other data from a vantage point or location that might otherwise be difficult or cumbersome to reach. UAVs are used for various purposes, such as for recreation, scientific exploration, military operations, intelligence gathering, and commercial uses. UAVs for commercial and recreational use typically have multiple rotors so that they are agile and rapidly responsive to flight commands.

For these reasons, UAVs play an increasingly important role in security and surveillance by providing long-range vision and other sensing capability from viewpoints at altitude—a capability which can be achieved in the short time it takes to launch and pilot a drone to a desired viewpoint. UAVs can monitor the sky and terrain with a sweeping perspective controlled by the drone pilot who typically navigates the drone according to a first-person view from a camera onboard the UAV. As UAVs are employed for an increasing number of activities that used to be largely unattainable due to cost or complexity, so, too, has the need for greater automation in flying drones increased. In more complex use cases, multiple tasks must be performed simultaneously, for example: as the UAV is piloted along a trajectory, the UAV's orientation along the trajectory may be in the direction of flight or it may be actively controlled by the pilot, the view from the onboard camera is evaluated relative to the purpose of the flight, and obstacles during flight must be accounted for, and, on top of all this, the pilot himself or herself may be in motion as well. In a controlled scenario, such as when filming a movie, many of the variables can be largely anticipated and controlled. But in a dynamic, real-world scenario such as a military operation with multiple unpredictable variables, the operation of the drone may exceed the ability of a single pilot, even a highly skilled one.

Overview

Technology for operating an unmanned aerial vehicle is disclosed herein that operates a UAV relative to the location of a moving beacon. The beacon comprises a transmitter which may be affixed to a moving vessel, such as a vehicle or a ship, and which continually transmits its position. In an implementation, the UAV comprises a flight control system and an electromechanical system directed by the flight control system. The flight control system is configured to track a position of a beacon that is in motion and monitor a difference between an actual position of the unmanned aerial vehicle and a desired position of the unmanned aerial vehicle relative to the position of the beacon. The flight control system configures one or more flight objectives based on one or more factors comprising whether the difference between the actual position and the desired position exceeds a threshold, wherein the flight objectives comprise a velocity objective and a position objective. The flight control system also commands the electromechanical system based at least on the one or more flight objectives.

In some implementations, the flight control system is configured to at least track the moving beacon and fly the UAV to maintain a desired position relative to the beacon (i.e., the UAV is stationary relative to the beacon). The flight control system flies the UAV to maintain the desired position by directing the electromechanical system to maneuver the UAV to match or attempt to match the velocity of the beacon. When the actual position of the UAV relative to the beacon drifts at least a threshold amount away from the desired position, then the flight control system directs the electromechanical system to perform a corrective maneuver that returns the UAV to the desired position relative to the beacon. Upon the UAV returning to the desired position, the flight control system resumes directing the electromechanical system to match the velocity of the beacon.

In the same or other implementations, the flight control system is further configured to calculate a flight path along which to fly the UAV based on maintaining the desired position relative to the beacon and directing the electromechanical system to maneuver the UAV according to the flight path. In an implementation the flight control system comprises an optimization engine to calculate the flight path based on at least the desired position relative to the beacon and one or more inputs, wherein the inputs comprise flight commands.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
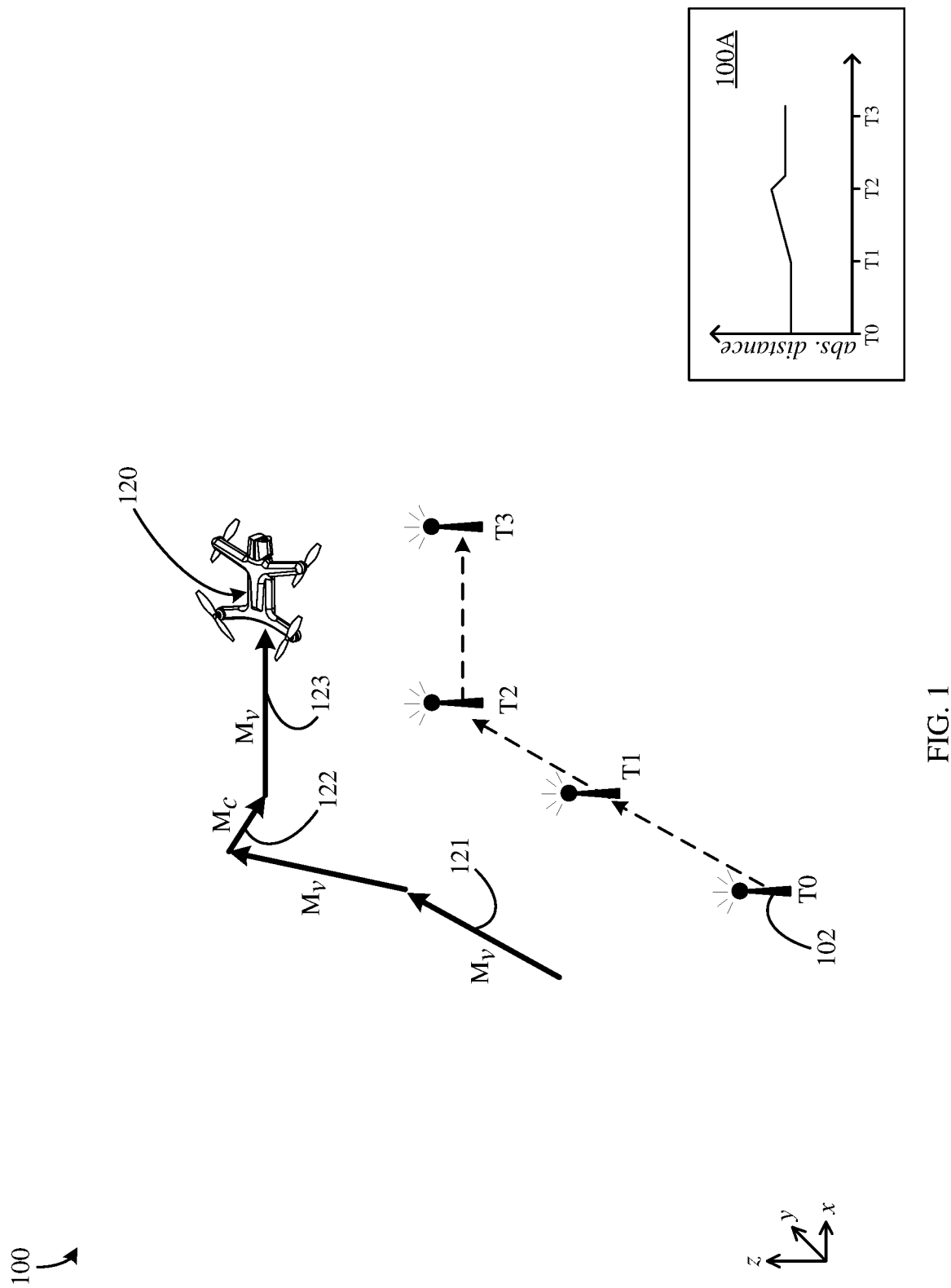
FIG. 1 illustrates an operational environment of a UAV in an implementation.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Technology discussed herein enables a UAV to track a moving beacon while in flight, to maintain a fixed position relative to that moving target, and to perform complex flight operations as it tracks the beacon in various implementations. In an implementation, a UAV receives the location data of a beacon which is in motion, and which is continually transmitting its location. The UAV maintains a fixed position relative to the beacon by tracking the location of the beacon according to the transmitted position data from the beacon as the beacon travels. As the UAV maintains its desired position relative to the beacon, the UAV can receive and execute flight commands in the form of inputs from various sources, such as commands actively issued by a pilot using remote control, additional automated operations such as visual tracking of another object, or a geofence restriction on flight.

For example, a UAV used for cinematography is to record a video footage of a vehicle as it travels on a meandering country road from a distant aerial perspective. The UAV is deployed to track the vehicle by maintaining a position that is 300 feet due east of the vehicle at an elevation of 400 feet. The UAV is further commanded to maintain line of sight to the vehicle as it travels along the road. A beacon onboard the vehicle continually (i.e., at regular intervals) transmits its position in the form of GPS coordinates, along with a timestamp. The UAV receives the position data of the beacon and computes a flight path to maintain the desired position relative to the beacon on a continual basis. The flight control system onboard the UAV computes the flight path by computing, at least, a velocity of the beacon (i.e., speed and direction) as well as its own position relative to the beacon.

In the same or other implementations, the UAV maintains the desired position relative to the beacon by flying a flight path in such a way as to match the UAV's velocity (i.e., speed and direction) to the beacon's velocity. The flight path computation prioritizes matching the velocity of the beacon unless and until it detects a drift in the position of the UAV relative to the beacon (i.e., a difference between the UAV's actual position and the desired position relative to the beacon) exceeds some threshold, at which time the flight control system will prioritize correcting the drift over matching the velocity until the position error is brought below the threshold.

In the same or other implementations, the UAV maintains the desired position relative to the beacon by flying a flight path in such a way as to minimize or correct for the difference or, essentially, error between the UAV's velocity (i.e., speed and direction) and the beacon's velocity and to minimize or correct for the error between the UAV's position relative to the beacon and the desired position. The flight path computation is computed to achieve at least these two objectives which are prioritized in the computation: correcting for the velocity error takes precedence over correcting for the position error unless and until the position error exceeds some threshold, at which time the flight control system will prioritize minimizing position error over velocity error until the position error is brought below the threshold.

In the same or other implementations, the velocity correcting objective and position correcting objective may be switched on or off in computing the flight path, effecting a binary mode of operation. For example, in some circumstances, minimizing or correcting the velocity error may result in weighting the velocity correcting operation so highly that correcting the position error is weighted to 0%, or close to 0% (i.e., position correction is not factored into the flight path computation), and vice versa. In still other implementations, the weighting or prioritization of the velocity and position correcting objectives may depend not only on the magnitude of the difference or error but also on the rate at which the error is changing. In this way, the UAV can maintain its desired position relative to the beacon with a very high level of precision.

In the same or other implementations, as the flight control system calculates the flight path using an optimization engine or other computational engine or algorithm, the computational weighting or prioritization of the various inputs and objectives are made relative to each other. Thus, as one input or objective becomes more important in the flight path calculation, other inputs or objectives are necessarily downgraded in importance. The prioritization scheme may depend on the magnitude of velocity and/or position errors, rate of change of the errors (e.g., how fast the UAV is drifting from the desired position), on inputs received from a remote control, or on the circumstances, such as the UAV encountering an obstacle in its path. The prioritization scheme may also be manually adjusted.

The ability of the UAV to automatically maintain a desired position relative to the beacon as the beacon travels enables the pilot to focus on other aspects of UAV operation, such as controlling an onboard camera as it records the scene without having to actively pilot or navigate the UAV at the same time, including issuing flight commands to the UAV as it maintains its position relative to the beacon. For example, the pilot may command the UAV to maintain line of sight to the beacon, or, more specifically, to the front passenger window of the vehicle. Alternatively, the pilot may command the UAV to maintain its camera orientation due west, so that regardless of the direction of the vehicle's travel, the flight control system computes a flight path which maintains its relative position to the beacon but which also maintains the specified orientation independently from the UAV's heading. The flight path can include a position, velocity, acceleration, jerk, snap, orientation, and changes in orientation (i.e., angular velocities) of the UAV, but may also include other operations, such as camera or sensor operation, that are coordinated with the motion or position of the UAV. Orientation refers to the UAV's yaw, pitch (or gimbal), and/or roll angles which are typically defined relative to the direction of forward motion.

In still the same or other implementations, the UAV can perform other orientation maneuvers as it tracks the moving beacon. The flight control system may compute a flight path to visually track an object, which may be stationary or in motion, apart from the beacon or the vehicle. For example, on a reconnaissance mission, a UAV may be deployed to provide aerial surveillance for a convoy of vehicles, wherein the UAV maintains a fixed position relative to a beacon on one of the vehicles, but oriented to provide the pilot with a view one kilometer ahead of the convoy. Similarly, multiple UAVs can be deployed to provide a wider range of visual coverage by flying in a fixed formation around the convoy, with each UAV oriented in a different direction.

Beyond performing orientation maneuvers as the UAV maintains its desired position relative to the beacon, the UAV may execute flight commands regarding its position or velocity from the UAV pilot using a remote control. For example, the pilot may command the UAV to move forward 50 feet from the desired position or to accelerate to a velocity that is greater than the beacon's velocity for one segment of its flight. Thus, the flight control system must continually calculate the UAV's flight path to maintain its desired position but must also incorporate these one or more additional inputs. When the additional inputs cease, the UAV regains its desired position by computing a flight path to the desired position and then resuming its flight path calculations based on velocity and position correcting objectives and possibly other inputs, along with the relative priorities or computational weighting of the objectives and other inputs.

For example, the flight control system may compute a geofence relative to the beacon, such as one that constrains the UAV from flying out of range of the beacon or one that restricts the UAV from flying too close to the beacon, for example, to prevent the UAV from entering a restricted airspace. The computed geofence, therefore, is an additional input to computing the flight path of the UAV.

In a more complex flight operation of multiple inputs, such as tracking and maintaining a position relative to the beacon, maintaining an orientation which may be independent of the UAV heading, receiving a flight command from a remote control, and obeying a geofence constraint, the flight control system of the UAV must compute on a continual basis a flight path to satisfy these various and sometimes conflicting demands. For example, a flight command issued by the UAV pilot may take precedence over flying the desired position relative to the beacon, so that the flight control system must continually adjust the prioritization or weighting of the inputs as it computes the UAV's flight path. In another example, the weighting of the geofence may dominate the flight path computation when the UAV is within a specified distance of the geofence, but at other times, when the UAV is far enough away, the geofence has a relatively low weight as compared to the desired position and other inputs.

Figure 3:
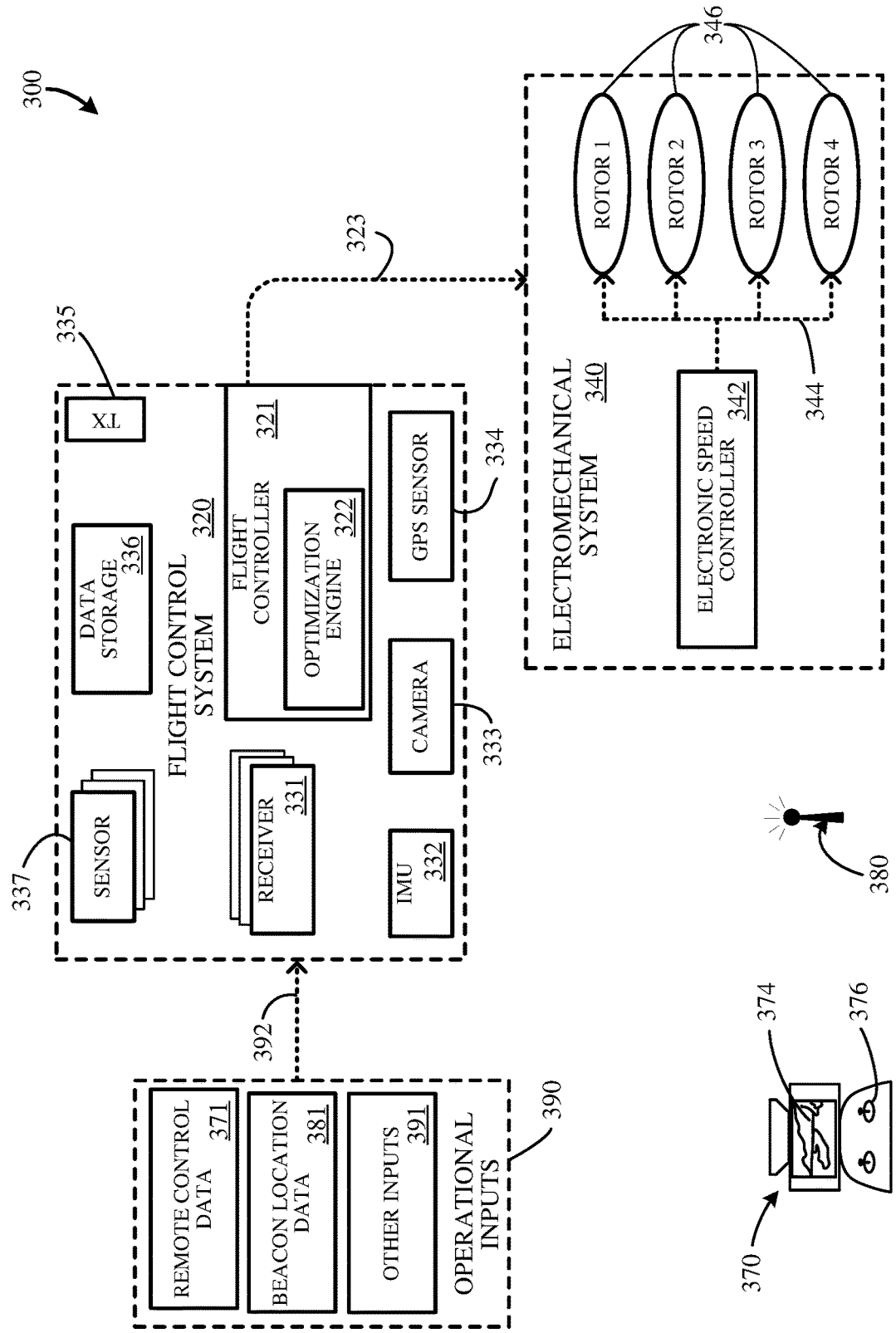
FIG. 3 illustrates a systems architecture of a UAV in an implementation.

Turning now to the drawings, FIG. 1 illustrates an operational environment 100 of a UAV in flight maintaining a desired position relative to a moving beacon in an implementation. Operational environment includes UAV 120 and beacon 102. In FIG. 1, beacon 102 is representative of a device in motion which transmits is location at regular intervals. UAV 120 is representative of an unmanned aerial vehicle in flight which is tracking the location of beacon 102. The trajectory of beacon 102 is indicated by dashed arrows at points in time $T_0$ to $T_3$. The trajectory of UAV 120 is indicated by maneuvers 121-123. UAV 120 is elevated above and positioned off to the side of beacon 102. An exemplary systems architecture of a UAV such as UAV 120 is illustrated in FIG. 3, which includes a flight control system operating an optimization engine to navigate the UAV and an electromechanical system which propels the aircraft.

Figure 2:
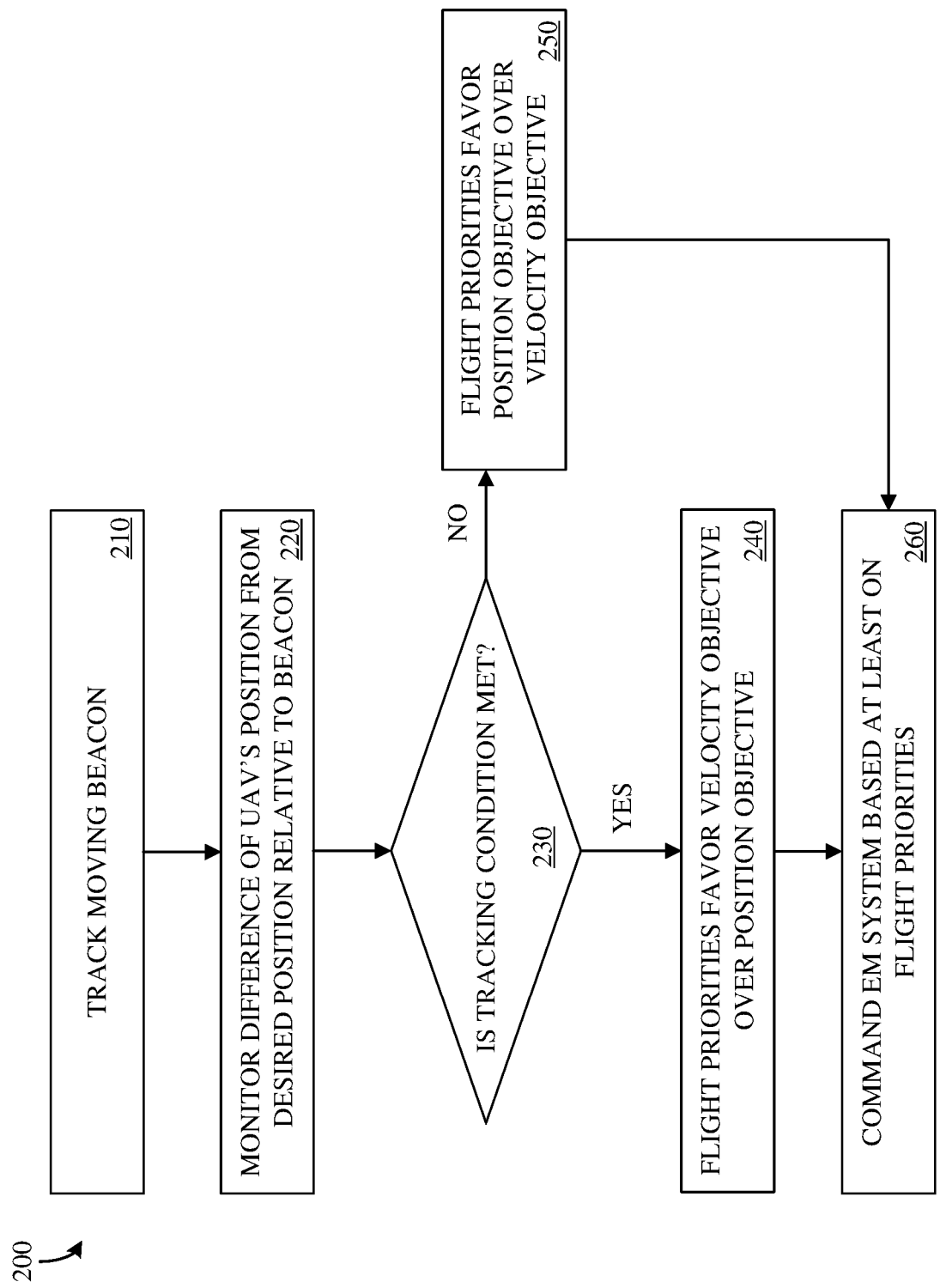
FIG. 2 illustrates a method of operating a UAV in an implementation.

As beacon 102 is in motion and continually transmits is timestamped position data. UAV 120, in flight, detects the location of beacon 102 by receiving its transmitted position data. As UAV 120 tracks the position of beacon 102, it flies the trajectory indicated by maneuvers 121-123 based on the position data. FIG. 2 illustrates a process employed by a UAV such as UAV 120 to accomplish the tracking illustrated in FIG. 1. A flight control system onboard the UAV receives position information for a beacon, such as beacon 102, comprising the longitude, latitude, altitude, and timestamp data obtained from a GPS, GLONASS, or other terrestrial or satellite-based navigation system (step 210). The flight control system uses the GPS data received from the beacon to compute the velocity of the beacon as well as the position of the UAV relative to the beacon. The flight control system monitors the UAV's position relative to the beacon or, more specifically, any drift or deviation in the UAV's position relative to the desired or specified position relative to the beacon (step 220).

As the flight control system monitors the UAV's position relative to the beacon, it determines whether the tracking condition is met: the flight control system detects whether the UAV is within a threshold or allowable difference from the desired position (step 230). If it detects that the UAV is within a threshold or allowance from the desired position, the flight control system directs the flight of the UAV such that the flight priorities favor matching or attempting to match the velocity of the beacon (step 240) over positioning the UAV at the desired position. The flight control system commands the electromechanical (EM) system to maneuver the UAV accordingly (step 260) by generating instructions for the EM system based at least in part on the flight priorities determined in steps 230-250.

If, however, the flight control system detects that the UAV has drifted beyond the threshold of the desired position, the flight control system directs the flight of the UAV such that the flight priorities favor positioning the UAV at the desired position over matching or attempting to match the beacon's velocity (step 250). The flight control system commands the EM system to fly the UAV accordingly (step 260). To command the EM system, the flight control system generates instructions according to a computed flight path based on the flight priorities as determined in steps 230-250. As discussed herein, phrases such as "matches the velocity of beacon" refer to attempts to match the velocity of the beacon and can include minor variations, i.e., the velocities will be matched within a margin of error.

The computed flight path also may incorporate other inputs, such as a flight command issued from a remote control. For example, as the UAV tracks and maintains its position relative to the beacon, the pilot may issue flight commands to obtain a particular view from an onboard camera by adjusting the orientation (e.g., pitch and/or yaw angles) of the UAV. In other operational scenarios, the computed flight path also incorporates input relating to the atmospheric or environmental conditions, such as wind speed and direction. The computed flight path may also incorporate forecasts or extrapolations of the movement of beacon 102 produced by regression techniques or artificial intelligence or machine learning models.

Returning to FIG. 1, the following describes an exemplary application of process 200 to environment 100. As beacon 102 travels, it continually transmits its location which is received by the flight control system onboard UAV 120. The transmissions may occur at a regular frequency, e.g. 100 Hz. For the sake of clarity, this simplified exemplary implementation will be discussed in terms of the actions performed over a very limited course of travel, i.e., as beacon 102 moves from a position at time $T_0$ to a second position at time $T_1$, and so on to $T_3$. At time $T_0$, UAV 120 is at its desired position relative to beacon 102. Beacon 102's movement from $T_0$ to $T_1$ comprises a velocity (i.e., speed and direction or velocity vector) which is computed by the flight control system onboard UAV 120.

The flight control system issues instructions based on the velocity-matching maneuver $M_v$ 121 to the electromechanical system onboard UAV 120 which result in UAV 120 matching or attempting to match beacon 102's velocity from $T_0$ to $T_1$. Performing a velocity-matching maneuver comprises velocity matching or correction having a higher priority than positioning in computing the flight path, but other factors including positioning or position correcting may also figure into the flight path computation. By continually tracking the position and calculating the velocity of beacon 102 and its position relative to beacon 102, UAV 120 maintains its desired position relative to beacon 102 as beacon 102 travels.

Continuing with FIG. 1, beacon 102 travels from $T_1$ to $T_2$. However, it is assumed for exemplary purposes that a wind gust causes UAV 120 to drift to a position different from the desired position as it executes the flight path according to the matching beacon 102's velocity. The flight control system onboard UAV 120 determines that it is not at its desired position relative to beacon 102 by computing an error between its actual position and the desired position. In an implementation, when computing the flight path, the flight control system varies the computational weight or priority of maintaining the UAV's desired relative position with the position error relative to the desired relative position. In other implementations, the flight control system computes a threshold or allowance around the desired position such that, if the deviation exceeds the allowance, the deviation triggers the flight control system onboard UAV 120 to perform a corrective maneuver.

At $T_2$, the deviation detected by the flight control system exceeds the threshold. For example, the flight control system may detect a deviation of 0.42 m which exceeds a threshold of 0.1 m. In response, the flight control system computes corrective maneuver $M_c$ 122 to reposition UAV 120 to the desired position relative to beacon 102 and instructs the EMS to perform the corresponding flight operation. Corrective maneuver $M_c$ 122 comprises a flight path based on increasing the computational weight or flight priority of position error correction so it has a higher priority than the velocity matching or correcting flight priority. Beacon 102 continues its travel from $T_2$ to $T_3$. Having regained the desired position, UAV 120 continues its flight according to beacon 102's velocity and position. As beacon 102 moves from $T_2$ to $T_3$, the flight control system computes beacon 102's velocity and UAV's actual position relative to the beacon and commands UAV 120 to fly maneuver 123 accordingly.

Inset view 100A charts the absolute distance of UAV 120 from beacon 102. In an implementation, UAV 120 computes its distance based on its position relative to beacon 102 by comparing the position coordinates of beacon 102 by its own position coordinates from an onboard GPS sensor or by detecting its location, and therefore distance, relative to beacon 102 using other location-identifying technology.

FIG. 3 illustrates systems architecture 300 of a UAV, such as UAV 120 of FIG. 1 or other drones, in an implementation. Systems architecture 300 includes flight control system 320, electromechanical system 340, and operational inputs 390. Flight control system 320 comprises one or more receivers 331 for receiving information from beacon 380 as well as other operational inputs 390, such as remote control data 371 from remote control 370. Flight control system 320 further comprises flight controller 321, inertial measurement unit (IMU) 332, camera 333, GPS sensor 334, transmitter TX 335, and data storage 336. Data storage 336 includes persistent or nonvolatile memory or a removeable memory card (e.g., an SD card) for recording flight and sensor data gathered from onboard devices, including photos or video captured by onboard cameras, or for storing programmed flight programs for use by the UAV, such as a trajectory to be flown relative to the desired position relative to the beacon, a visual tracking operation (e.g., the UAV visually tracks another object as it maintains a position relative to the beacon), or a computed spline flight path based on a set of keyframes. Flight control system 320 may also comprise one or more other sensors 337 such as barometers, altimeters, additional cameras, heat-detecting sensors, electromagnetic sensors (e.g., infrared or ultraviolet), anemometers or wind sensors, magnetometers, and so on. In an implementation, there may be multiple cameras onboard the UAV, and onboard camera 333 may be used to visually track objects while the UAV is in flight.

Electromechanical (EM) system 340 provides the propulsion for the UAV. EM system 340 comprises electronic speed controller 342 which throttles rotors 340 according to flight instructions received from flight control system 320. Operational inputs 390 comprise inputs to flight control system 320 such as remote control data 371 from remote control 370 comprising pilot input, beacon location data 381 received from a beacon (such as beacon 102 of FIG. 1), and other inputs 391 relating to the flight or operations of the UAV.

In an operational scenario, flight controller 321 uses beacon location data 371 transmitted from beacon 380 comprising at least timestamped latitude, longitude, and altitude data to track the position of beacon 380 (i.e., receive the position data of beacon 380) and to compute the velocity of beacon 380 and its position relative to beacon 380. Flight controller 321 includes optimization engine 322 which receives the various flight- and operation-related data (including the position data of beacon 380) and computes a flight path to accomplish one or more flight objectives, wherein one objective is to maintain the UAV at a desired position relative to beacon 380. Flight controller 321 employs optimization engine 322 to compute a flight path to maintain the desired relative position and generates instructions for the EM system to maneuver the UAV to continually match (i.e., attempt to match) the velocity of beacon 380. As it matches the velocity of beacon 380, flight controller 321 also continually monitors its position relative to beacon 380 so that if the UAV drifts away from its desired position relative to beacon 380, flight controller 321 computes a flight path to regain the desired position relative to beacon 380. In doing so, flight controller 321 may downgrade matching the velocity of beacon 380 or even pause the velocity matching altogether until the UAV regains the desired position relative to beacon 380. When the UAV regains the desired relative position, flight controller 321 maintains that relative position by matching the velocity of beacon 380 (while also continually monitoring its desired position).

Continuing with the operational scenario, flight controller 321 determines that the UAV has drifted from its desired position by computing the actual position of the UAV relative to beacon 380 and comparing the actual position with the desired position. When the deviation between the actual position and desired position increases or exceeds a threshold value or increases at a rate exceeding a threshold value, flight controller 321 will modify its flight path calculation by downgrading matching the velocity of beacon 380 and prioritizing regaining the desired position. The threshold value can be adjusted according to the mission or atmospheric conditions the UAV encounters while flying. For example, in gusty winds, it may be preferable to tighten the threshold value to reduce drift. In some implementations, the extent to which position correction factors into the flight path computation may vary directly with the magnitude of the position error without reference to a threshold value. Similarly, the extent to which velocity correction factors into the flight path computation may vary directly with the magnitude of the velocity error without reference to a threshold value. The rate at which the position or velocity error is changing may also factor how the correction factors are weighted in the flight path computation. Higher-order derivatives of velocity error or position error may also be incorporated into the flight path calculation, for example, directly or in how various inputs or objectives are weighted in the calculation.

As flight controller 321 computes a flight path to match the velocity of beacon 380 and maintain the desired relative position, it may also receive pilot input from remote control 370 comprising flight or operation commands as it tracks beacon 380. The UAV may receive a command to modify its location by flying 20 feet further away from beacon 380 or to accelerate the UAV to move to a location ahead of beacon 380, or to orient the UAV in another direction from its heading. In another exemplary implementation, the UAV may receive a command from remote control 370 to visually track another object. Optimization engine 322 receives the pilot input as well as beacon location data 381 from beacon 380, and with various other inputs 391 such as barometric data, and continually computes a flight solution optimized to achieve the at least two objectives of maintaining a position relative to the beacon and orienting the UAV and/or gimbal so camera 333 can maintain line-of-sight to the object. Additional flight objectives may be to minimize energy expenditure in order to maximize battery life, to avoid obstacles in the UAV's path, to not cross a geofence (i.e., to not exceed a maximum distance from the beacon) or a reverse geofence (i.e., to encroach a minimum distance to the beacon), or to maintain flight at a fixed altitude. Because multiple flight objectives may conflict, the inputs and/or objectives may also comprise a weighting or prioritization to determine an optimal flight path. For example, an obstacle avoidance function may have a higher priority than maintaining the desired position relative to the beacon.

In an operational scenario, optimization engine 322 computes a desired position relative to beacon 380 according to multiple inputs by computing a position relative to beacon 380, then computing the new position from the original position based on the one or more inputs. Optimization engine 322 continually recomputes the new position and original position relative to beacon 380 to produce an optimized flight path for the UAV. Effectively, the UAV is flown relative to a local frame of reference tethered to the original position. For example, the pilot may direct the UAV to maneuver to and maintain a new position that is 20 feet forward of the original position for a period of time as it tracks beacon 380. Optimization engine 322 computes a flight path to maneuver to and maintain the new position while continually tracking beacon 380, matching its velocity, checking the UAV's actual position against the desired position, and performing corrective maneuvers as needed. When the pilot ceases to issue flight commands, the UAV returns to its original position.

Optimization engine 322 computes an optimized flight path accounting for the various inputs and flight objectives. In an implementation, optimization engine 322 uses sequential or object-oriented coding logic, implemented in any number of text-based or graphical programming languages. In other implementations, optimization engine 322 comprises an optimization model which computes the flight path by maximizing certain flight variables while minimizing a cost function. For example, where the cost function depends on maximizing battery life, optimization engine 322 may compute a flight path to regain the desired position relative to beacon 380 which is slower but less energy-expensive than one which repositions the UAV more quickly but consumes more of the battery capacity.

In still other implementations, optimization engine 322 may comprise a machine learning model or artificial intelligence (AI) model to compute an optimized flight path. Optimization engine 322 can comprise an AI model which learns based on training sets comprising various operating scenarios, then makes inferences for the current operating scenario based on that knowledge. For example, optimization engine 322 may make inferences regarding the trajectory of beacon 380, such as predicting the direction or velocity of beacon 380 and compute the flight path based in part on the inferences.

In still other implementations, flight controller 321 may compute the flight path based on one or more inputs, including tracking and maintaining a position relative to beacon 380, using optimized or nonoptimized programmed logic comprising operating instructions in a sequential, object-oriented, text-based, machine-language, or other programming language. The programmed logic may comprise a single computational engine or a system of multiple computational engines which may incorporate machine learning or AI-based programming. Flight controller 321 may receive the various inputs and execute the programmed logic to prioritize or deprioritize the inputs according to the operating instructions. The programmed logic may effect a response similar to or the same as that of optimization engine 322, a neural network, or other type of computational engine. In an implementation, the inputs or actions programmed to occur based on the inputs may be throttled or scaled with reference to other inputs in the calculation of the flight path, which can include being switched on/off entirely in certain situations.

In computing a flight path for the UAV, flight controller 321 may also receive inputs from the various onboard sensors such as IMU 332. IMU 332 can include one or more sensors such as a gyroscope and an accelerometer which provide movement and orientation data to flight control system 320. Sensor 337 can comprise a barometric or altitude sensor by which flight controller 321 can control the UAV's altitude. For example, the UAV may be commanded to maintain a vertical distance of 120 feet above beacon 380, or the UAV may be commanded to maintain a fixed altitude of 120 feet. Electromechanical system 340 includes an electronic speed controller 342 which transmits control commands 344 to rotors 346. It may be appreciated that both flight control system 320 and electromechanical system 340 can include other elements in addition to (or in place of) those disclosed herein, which are illustrated for exemplary purposes.

In an implementation, the UAV may receive a command from remote control 370 to visually track an object as it maintains a desired position relative to beacon 380 which is in motion. Flight controller 321 continually computes a flight path to maintain the desired position relative to beacon 380 while continually adjusting the UAV's yaw and gimbal angles as it receives data from camera 333. Flight controller 321 generates instructions for EM system 330 accordingly.

Remote control 370 comprises display screen 374 which displays a real-time view from camera 333 and/or other onboard cameras. While a pilot can control the UAV based on his or her line of sight to the drone, remote controls for drones typically display the perspective of an onboard camera, referred to as the first-person view. First-person view capability affords the UAV pilot the ability to find and capture views from remote or difficult-to-access vantage points. In a typical implementation, camera 333 provides a first-person view transmitted to remote control 370 by transmitter TX 335. Other cameras among sensors 337 may provide views toward the ground or in other directions which can be displayed on display screen 374.

Remote control 370 also comprises input devices 376 by which the pilot can input commands to the UAV. Input devices 376 may comprise mechanical joysticks for manually controlling the speed, direction, and/or orientation of the UAV, but can also take the form of virtual controls on display screen 374 which is touch-enabled. Virtual controls can be on-screen button objects, virtual toggle switches, and sliders, for example, a slider to control the UAV's speed. In an implementation, input devices 376 issue flight commands relative to the desired position relative to beacon 380, that is to say, from a frame of reference tethered to the beacon. For example, if beacon 380 is moving north at 8 m/s and the UAV receives a command to fly west at 6 m/s, the resulting trajectory of the UAV will be 10 m/s in a northwesterly direction.

Remote control 370 may be a dedicated device, or it may be an application operating on a mobile computing device such as a smart phone, tablet or laptop computer capable of wireless communication with the UAV. Remote control 370 may also act as a beacon transmitting beacon location data 381 to flight control system 320. Wireless communication between remote control 370 and the UAV may be carried over a WiFi network or Bluetooth® link.

Figure 4:
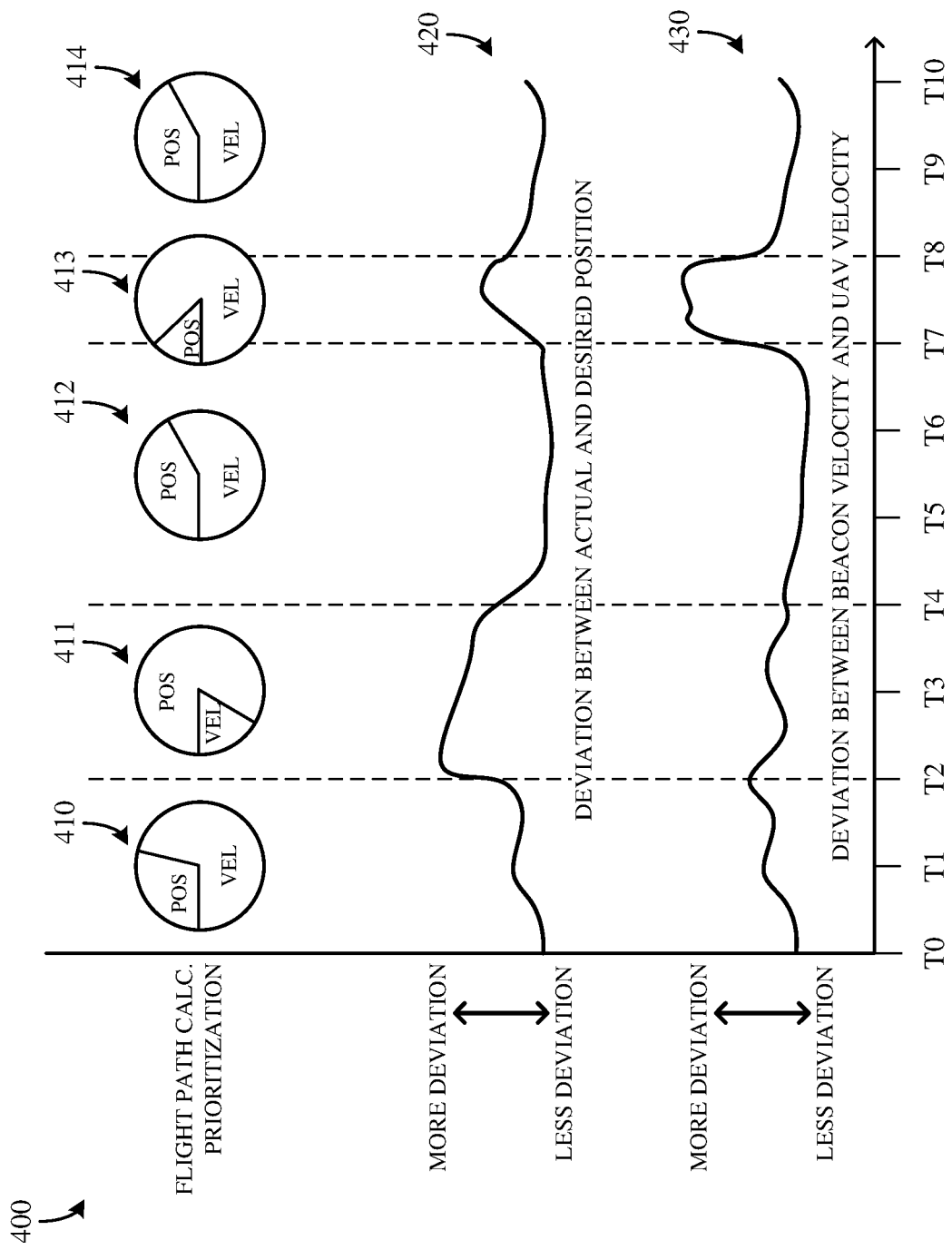
FIG. 4 illustrates an operational scenario of a UAV in an implementation.

FIG. 4 illustrates operational example 400 in which the UAV maintains a desired position relative to a beacon in motion as it tracks the beacon in an implementation. Pie charts 410-414 and graphs 420 and 430 are highly simplified representations of the computational states of the flight control system which are performed multiple times per second. The diagram shows how a flight control system computes a flight path by prioritizing various inputs during the flight of a UAV over time period $T_0$ to $T_{10}$ with the flight priorities or computational weights illustrated in pie charts 410-414, in an implementation. Graph 420 illustrates the deviation or error between the UAV's actual position and its desired position relative to the beacon. From time periods $T_0$ to $T_2$, the flight control system computes the UAV's actual position relative to the beacon and determines that the UAV's actual position is acceptably close to the desired position relative to the beacon. Accordingly, on pie chart 410, the flight path calculated by the flight control system is based on matching the UAV's velocity to the velocity of the beacon (as derived from its position data) and regaining or maintaining its position relative the beacon. It may be appreciated that the flight path computation may take other inputs in addition to those shown to which the weighting or prioritization scheme would be applied.

Continuing the discussion of FIG. 4, at time $T_2$, the flight control system detects that the UAV has drifted from the desired position to such an extent that the position error now exceeds a threshold value or that the position error is increasing at a rate exceeding a threshold value. In response, the flight control system incorporates a correction for the drift by giving higher priority to regaining the desired position relative to the beacon in computing the flight path, as shown in pie chart 411. In an implementation, the priority of regaining the desired position in the flight path computation increases as the error from the desired position increases.

From time $T_2$ to $T_4$, the flight control system issues commands to the EM system to maneuver the UAV back to the desired position relative to the beacon as the beacon continues to travel, thus the flight control system continually recomputes the desired position as well as the flight path and instructions to maneuver the UAV to regain that position. At time $T_4$, the UAV regains its desired position or has returned to within the threshold or acceptable distance from the desired relative position, and the flight control system downgrades the priority of flying according to error in position in calculating the flight path relative to the other inputs or objectives, as illustrated in pie chart 412. In an implementation, when the flight control system determines that the error exceeds a threshold value and prioritizes regaining the desired position, it may pause the velocity matching operation and/or other inputs until the desired position is regained.

Next, at time $T_7$, the flight control system detects that the velocity of the UAV does not match the beacon velocity, e.g., the error between the UAV velocity and beacon velocity is excessive or exceeds some threshold value, as illustrated in graph 430. For example, the beacon may perform a rapid change in its velocity (e.g., makes a sharp turn or rapidly accelerates) resulting in an abrupt increase in the error. In response, the flight control system prioritizes attempting to match the velocity of the beacon as illustrated in pie chart 413 over other inputs or objectives. The extent to which the flight control system heightens the priority of velocity matching may vary with the extent of the error or with the rate at which the error is increasing. At time $T_8$, the UAV has brought its velocity to within an acceptable range of the beacon velocity, at which point the flight control system downgrades the flight priority or computational weight of matching or attempting to match the velocity of the beacon. Notably, all of the computations and maneuvers of computational approach 400 performed by the UAV and its flight control system may occur in less than a second.

In an implementation, the flight control system performs the flight path computations illustrated in operational example 400 using an optimization engine, of which optimization engine 322 of FIG. 3 is illustrative. The optimization engine maintains a continual awareness of the UAV's position relative to the beacon and of the velocity of the beacon. In an implementation, the optimization engine throttles the prioritization or computational weighting of the inputs or objectives (i.e., maintaining the desired position, matching the velocity of the beacon, and other inputs) to correct error more aggressively on the signals (e.g., velocity or position) which have more error.

Figure 5A:
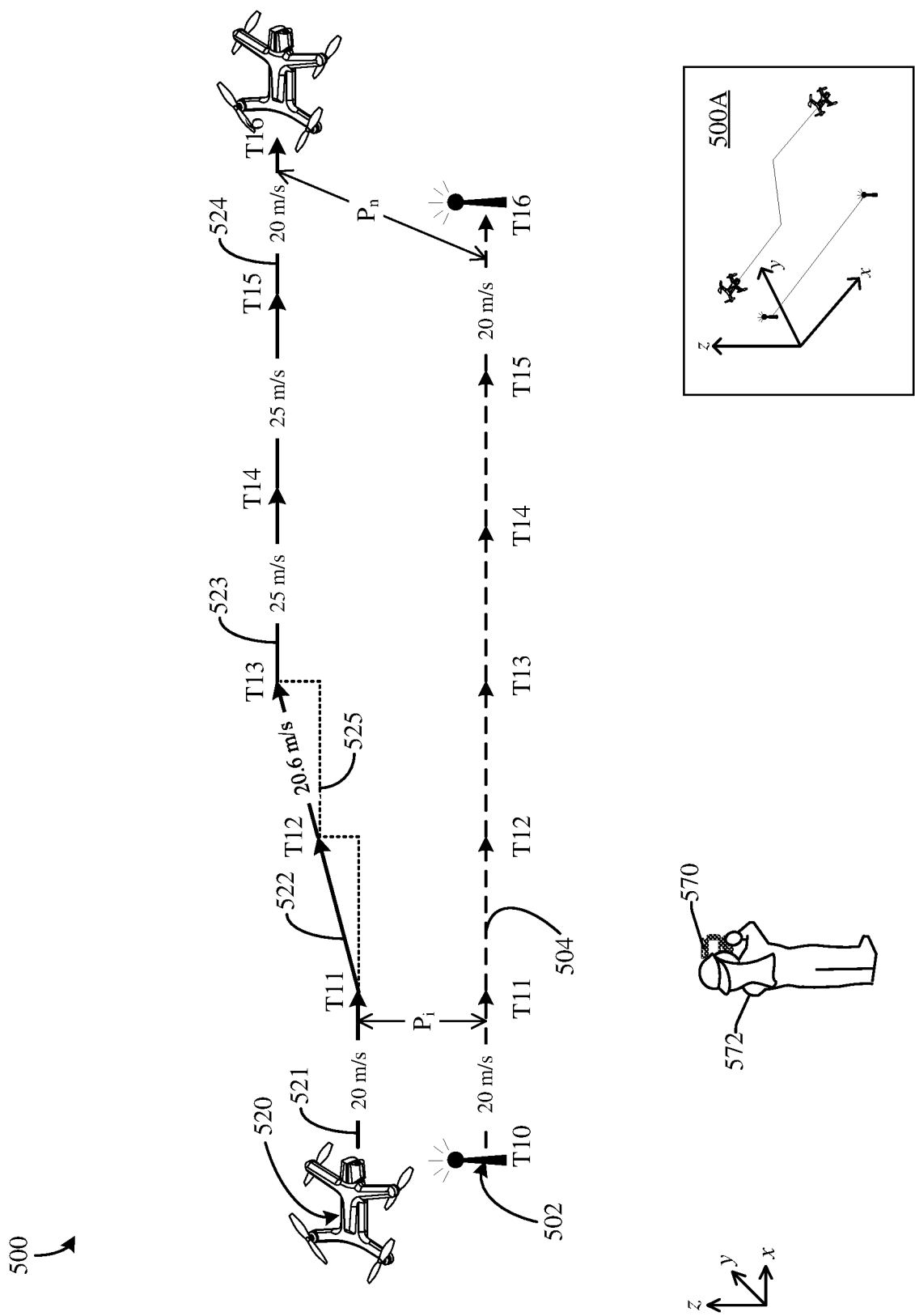
FIGS. 5A, 5B, and 5C illustrate multiple perspectives of an operational scenario of a UAV with pilot commands in an implementation.

FIG. 5A illustrates a view of operational scenario 500 from an elevated perspective of the travel of UAV 520 and beacon 502 in an implementation. For the sake of clarity, the actions and processes of UAV 520 with regard to beacon 502 are described over a limited period of time across a limited set of discrete locations, but it should be understood that these actions and processes typically occur several times per second. In operational scenario 500, UAV 520 flies flight path 521-524 to maintain a desired position that is stationary relative to moving beacon 502. As UAV 520 flies flight path 521-524, it receives and incorporates flight commands issued by pilot 572 from remote control 570. Remote control 570, in wireless communication with UAV 520, receives and displays real-time images captured by a camera onboard UAV 520 and transmits flight or operational commands issued by pilot 572. In operational scenario 500, from time $T_{10}$ to $T_{11}$, UAV 520 maintains a desired position relative to beacon 502 to the left of beacon 502 which is headed east at 20 m/s as indicated by dashed arrows 504. UAV 520 receives position data transmitted by beacon 502 in the form of time-stamped GPS coordinates. UAV 520 maintains its desired position by continually matching the velocity of beacon 502 (as derived from the GPS data) and continually comparing its actual position relative to beacon 502 with its desired position. If/when the flight controller onboard UAV 520 detects that a deviation between the actual position and the desired position has exceed a threshold value or as it detects an increase in the deviation, the flight controller computes a return to the desired position where it resumes, i.e., reprioritizes, matching the velocity of beacon 502. Inset view 500A illustrates an oblique perspective of flight paths 521-524 as UAV 520 flies a position relative to beacon 502 while incorporating user inputs received from remote control 570.

Continuing with FIG. 5A, from time $T_{11}$ to $T_{13}$, pilot 572 issues a flight command to UAV 520 via remote control 570 to fly north 5 m/s relative to beacon 502 as it tracks beacon 502. In an implementation, flight commands received from remote control 570 are interpreted according to a local frame of reference, that is, according to a frame of reference tethered to beacon 502. In various implementations, the flight commands can comprise position, velocity, and/or orientation commands issued by manipulating a mechanical or virtual joystick or other type of actuator on remote control 570. From time $T_{11}$ to $T_{13}$, the flight controller onboard UAV 520 calculates a flight path for UAV 520 which matches the heading of the moving beacon 502 and factors in the command to fly north at 5 m/s relative to beacon 502, resulting in flight path 522 on which UAV 520 flies in a northeasterly direction at about 20.6 m/s. Line 525 illustrates an implementation of adding the flight command to UAV 502's flight as it tracks beacon 502. As UAV 520 flies flight path 522 from $T_{11}$ to $T_{13}$, the flight controller continually computes and matches the velocity of beacon 502 and compares its actual position to the desired position indicated by flight path 522 incorporating the flight command. In an alternative implementation, the flight controller continually computes and matches the computed combined velocity of 20.6 m/s, that is, the velocity of beacon 502 plus the command to fly north 5 m/s. As UAV 520 traverses flight path 522, if the deviation between UAV 520's actual position and its desired position is greater than a threshold value, the flight controller computes a correction or modification to regain the desired position, then resumes flight according to velocity matching and checking its position relative to the beacon.

Next, from time $T_{13}$ to $T_{15}$, pilot 572 commands UAV 520 to fly due at east at 5 m/s relative to beacon 502, resulting in UAV 520 traveling due east at 25 m/s and moving ahead of beacon 502. At time $T_{15}$, pilot 572 ceases issuing flight commands to UAV 520, whereupon UAV 520 maintains its stationary position relative to beacon 502, indicated by flight path 524, from that point on.

Figure 5B:
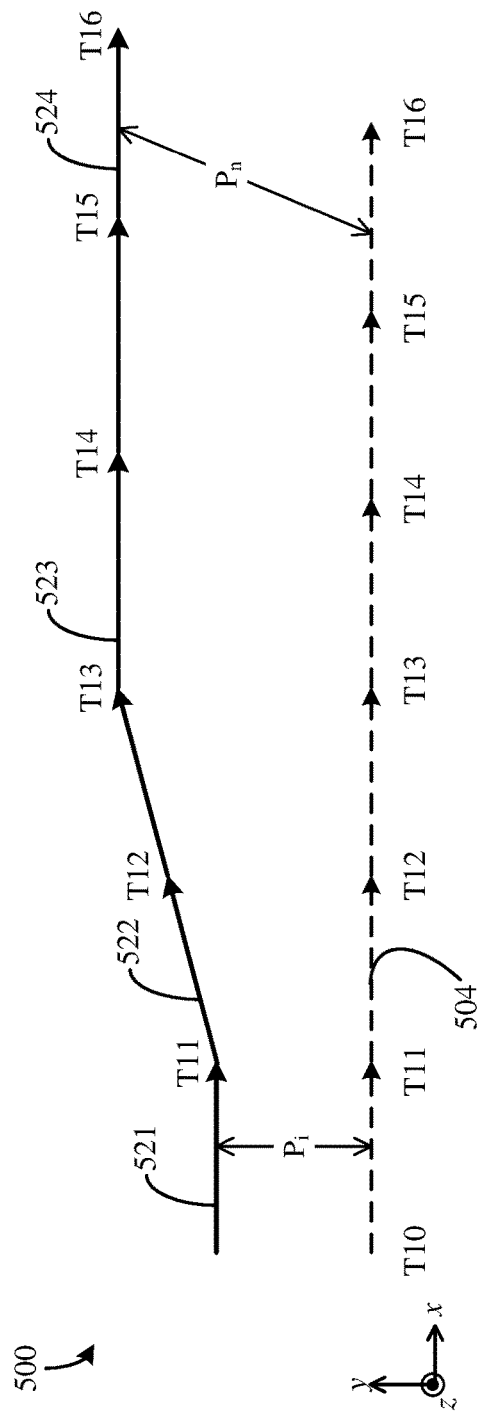
Figure 5C:
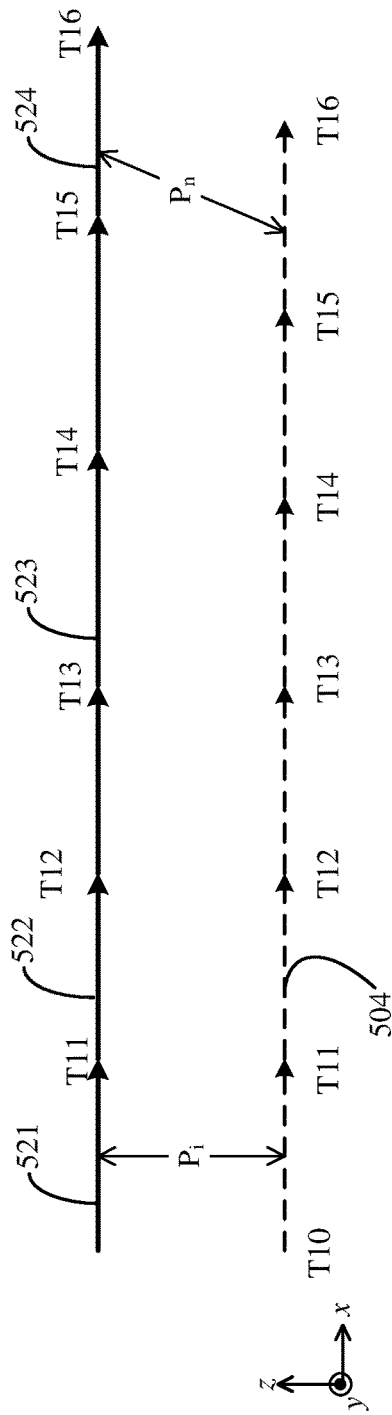

FIGS. 5B and 5C illustrate the flight path of UAV 520 in overhead and side views, respectively. The overhead view of FIG. 5B more clearly illustrates the flight maneuvers from T11 to T15 and the before and after relative positions of UAV 520 relative to beacon 502. From T10 to T11, UAV 520 maintains a stationary position to the left of beacon 502, indicated by relative position vector $P_i$. After performing the user inputs or pilot flight commands from T11 to T13 (to fly north 5 m/s) and from T13 to T15 (to fly east at 5 m/s), when pilot 572 ceases issuing flight commands, UAV 520 assumes a new fixed position relative to beacon 502 indicated by relative position vector $P_n$. The relative positioning indicated by $P_n$ is farther away from and forward of beacon 502. The side view of FIG. 5C shows that the vertical position of UAV 520 remains constant across flight path 521-524 with respect to beacon 502.

In some operational scenarios, UAV 520 tracks the altitude of beacon 502 and computes a vertical position to remain vertically stationary with respect to beacon 502. Alternatively, UAV 520 may be commanded to maintain a fixed altitude independent of any changes in altitude of beacon 502.

As UAV 520 tracks and maintains a desired position relative to beacon 502, if a flight command from remote control 570 results in a flight operation which exceeds the flying ability of the UAV (e.g., demands a higher speed than UAV 520 is capable of), remote control 570 displays a warning to pilot 572 that the flight command is not dynamically feasible.

Figure 6:
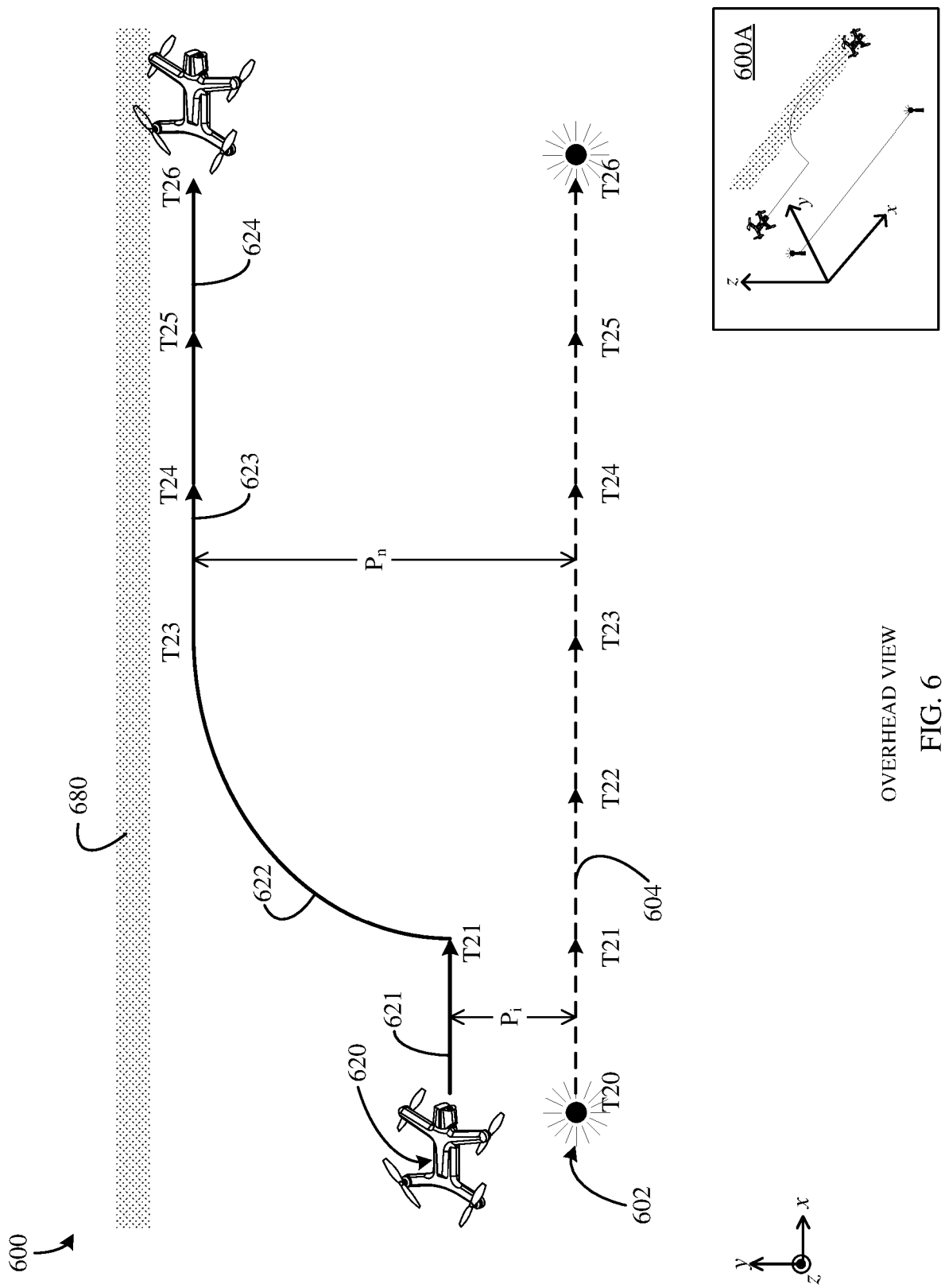
FIG. 6 illustrates an operational scenario of a UAV with a geofence in an implementation.

FIG. 6 illustrates an overhead view of operational scenario 600 in an implementation. In operational scenario 600, from $T_{20}$ to $T_{21}$, UAV 620 tracks and maintains a stationary position relative to beacon 602 moving east. As UAV 620 flies, the flight controller continually computes the location of geofence 680 based on the position data of beacon 601. Geofence 680 is a virtual boundary which may represent a maximum distance that UAV 620 should not exceed from beacon 602 (or of a remote control acting as beacon 602). In an alternative implementation, geofence 680 may act as a "reverse" geofence, wherein it represents a minimum distance UAV 620 should not encroach when approaching beacon 602, creating a restricted airspace around beacon 602. In other implementations, geofence 680 may indicate a geographic boundary, a restricted airspace boundary, or a political boundary which constrains where UAV 620 can fly.

Continuing with FIG. 6, the flight control system continually computes the location of geofence 608 relative to beacon 602. At time $T_{21}$, a remote control in wireless communication with UAV 620 issues a flight command to UAV 620 to fly north relative to beacon 602. UAV 620 moves away from its stationary position relative to beacon 602 as the remote control data takes precedence over the positioning operation. In an implementation, an optimization engine of the flight controller, of which optimization engine 322 of FIG. 3 is representative, computes optimized flight paths 621-624 based on at least the stationary position relative to beacon 602 and remote control data, of which remote control data 371 is representative. The optimization engine assigns weights to the various inputs in calculating an optimal flight solution so that, as in this example, a flight command received from a remote control has a higher priority than maintaining the stationary position relative to the beacon. In other implementations, the optimization engine may incorporate and assign weights to other inputs, such as from an obstacle avoidance capability or a programmed operation maintaining the camera orientation to the north. As flight paths 621-624 are computed, the flight controller onboard UAV 620 maintains a continual awareness of the stationary position relative to beacon 602 in computing the optimal flight solution.

In operational scenario 600, UAV 620, in its stationary position relative to beacon 602, also maintains an awareness of geofence 680 by continually computing its location. In an implementation, while UAV 620 is sufficiently distant from geofence 680 on flight path 621, geofence 680 will have a low priority and its presence does not impact flight path 621. However, as UAV 620 approaches and comes within a minimum threshold distance of geofence 680 on flight paths 622-624, the optimization engine of the flight controller will increase the priority or computational weighting of geofence 680 as it computes flight paths 622-624. Prioritizing geofence 680 over other inputs, such as the command to fly north, will prevent UAV 620 from crossing geofence 680. Thus, from $T_{24}$ onward, UAV 620 continues tracking and maintaining a position relative to beacon 602, but the flight command to fly farther away from beacon 602 is effectively overridden by geofence 680.

Inset view 600A illustrates an oblique perspective of flight paths 621-624 as UAV 620 flies a position relative to beacon 602 while incorporating pilot inputs and obeying the flight constraint presented by geofence 680, wherein geofence 680 constrains the distance UAV 620 can fly away from beacon 602 or restricts UAV 620 from flying into a restricted airspace.

In an implementation, if UAV 620 loses contact with beacon 602 (or the remote control acting as beacon 602), the flight control system will direct the EM system to perform one or more recovery maneuvers to regain contact with beacon 602. For example, in one recovery maneuver, UAV 620 may hover at the point where contact was lost and pivot on its vertical axis to try to detect a signal from beacon 602. In an alternative recovery maneuver, UAV 620 may fly to a rendezvous zone or location which is computed based on the location of last contact. Similarly, the remote control, upon detecting or receiving an indication that UAV 620 has lost with beacon 602 (or with the remote control), can identify the last point of contact and the rendezvous zone or location based on that location.

Figure 7:
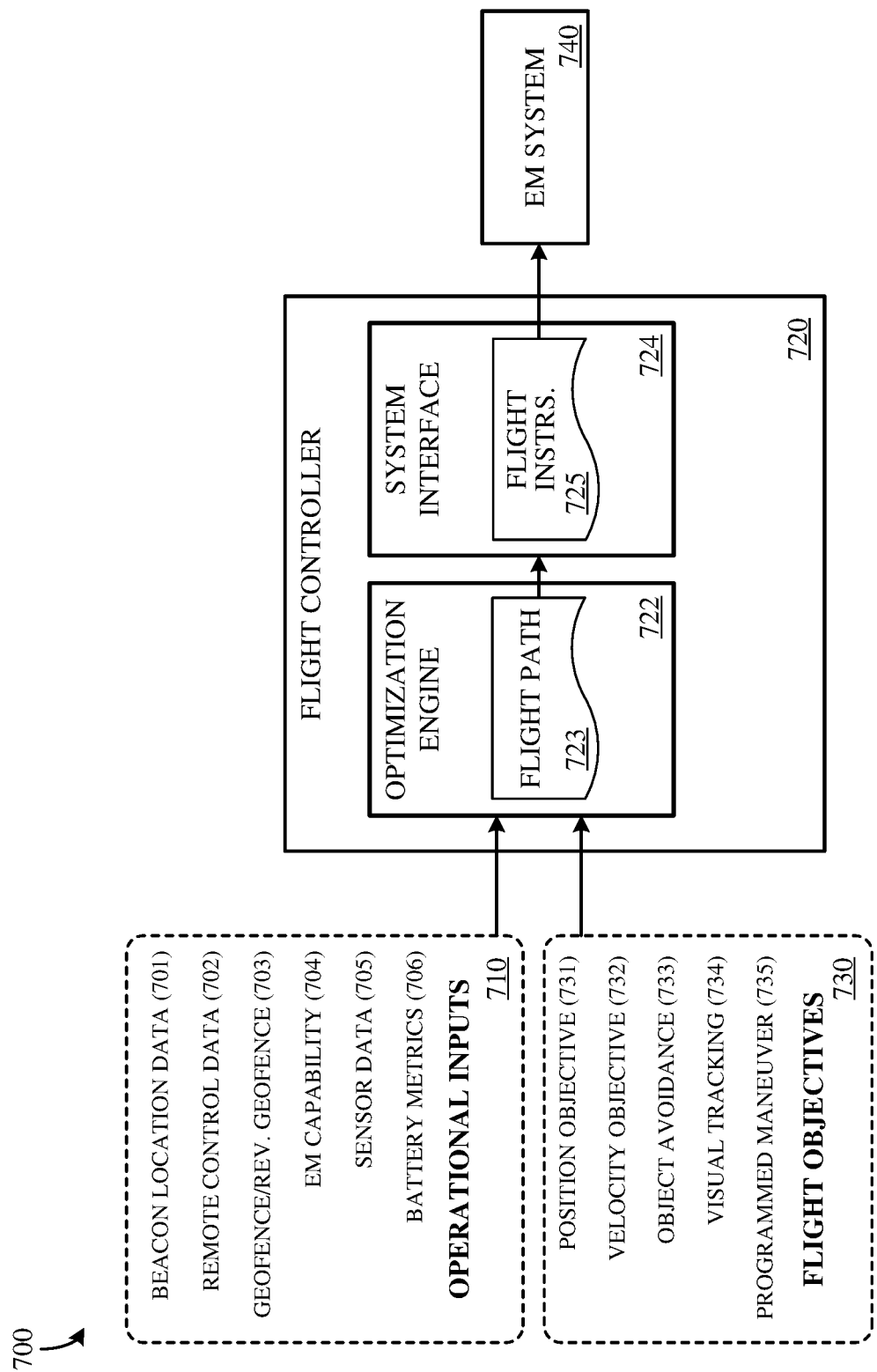
FIG. 7 illustrates an operating architecture of a UAV in an implementation.

FIG. 7 illustrates operational architecture 700 of a UAV, such as UAV 520 or 620 of FIGS. 5A-C and 6, in an implementation of the technology disclosed herein. Flight controller 720 onboard the UAV comprises optimization engine 722 which receives flight or operational inputs and computes a flight path 723 responsive to the inputs. Optimization engine 722 may incorporate a prioritization or weighting scheme when receiving multiple conflicting inputs in when computing flight path 723. Flight controller 720 also comprises system interface 724 which computes flight instructions 725 for the electromechanical (EM) system 740 of the UAV based on flight path 723 and transmits flight instructions 725 to EM system 740.

Flight controller 720 continually computes flight path 723 based on a number of inputs including operational inputs 710. Flight path 723 comprises at least a flight path to maintain a stationary position relative to a beacon in motion, such as beacon 502 or 602 of FIGS. 5A-C and 6 but may incorporate additional flight objectives including flight objectives 730. The stationary position is based on beacon location data 701 comprising beacon position information along with the time of that position. In an implementation, beacon location data 701 are timestamped GPS coordinates.

Flight path 723 may also comprise remote control data 702 from a remote control in wireless communication with the UAV comprising flight or operations commands. For example, a pilot operating the remote control may command the UAV to maintain a camera perspective due east of its stationary position relative to the beacon. Flight controller 720 must then continually compute flight path 723 to maintain the eastward orientation of the UAV (e.g., by maneuvering the pitch and yaw angles of the UAV) as the UAV travels flight path 723.

Flight path 723 may further comprise geofence (or reverse geofence) 703, which acts as a virtual boundary constraining the flight and therefore flight path 723 of the UAV. In an implementation, optimization engine 722 may prioritize the various inputs in computing flight path 723. As flight controller 720 computes its position relative to geofence 703, optimization engine may increase the weight or priority of geofence 703 as the UAV approaches or come within a predetermined distance of geofence 703, thereby constraining the UAV from crossing geofence 703.

Continuing with FIG. 7, flight controller 720 may incorporate data relating to EM capability 704 of the UAV as it relates to the dynamic feasibility of flight path 723. For example, EM capability 704 may include information relating to the UAV's maximum speed or the UAV's ability to decelerate to a hover or to navigate a sharp turn. For another example, when optimization engine 722 computes flight path 723 which requires the UAV to fly at a speed that exceeds its maximum speed, flight controller 720 may compute flight path 723 comprising the maximum speed while transmitting a warning to the remote control that the flight command is not dynamically feasible.

Flight controller 720 may also incorporate sensor data 705 which can affect the flight or operations of the UAV. For example, an onboard barometer may determine the altitude of the UAV as it flies a position relative to the beacon where the UAV must maintain a fixed altitude while the beacon's altitude changes as it travels.

Flight controller 720 may also incorporate battery metrics 706 such as battery capacity, remaining power, and rate of consumption in computing flight path 723. For example, if flight controller 720 may prioritize a moderate rate of battery power consumption to maximize flight time and may throttle its responses to situations accordingly. Alternatively, flight controller 720 may prioritize achieving a particular objective, such as minimal drift from the static position over flight time as it tracks a beacon which is performing high-speed maneuvers, placing greater demand on the rotors to keep up.

Flight controller 720 may also incorporate flight objectives 730. Flight objectives 730 can include a beacon-tracking operation further comprising a position objective 731 and a velocity objective 732. Flight objectives 730 can also include flight operations such as object avoidance operation 733 whereby the UAV continually checks for obstacles in the vicinity of the UAV using one or more of its onboard cameras, radar, sonar, thermal-imaging, or other sensors. Upon detecting a nearby obstacle, optimization engine 722 may heighten the priority of obstacle avoidance operation 733 in computing flight path 723 to avoid flying the UAV into the obstacle. For example, a UAV may be deployed to gather video footage of a cycling race. The UAV tracks and maintains a position relative to a moving beacon onboard a chase vehicle (based on beacon location data 701) while continually adjusting the yaw and gimbal angles to maintain line of sight to a peloton in the race (based on visual tracking operation 734). As the UAV flies, a sensor onboard the UAV detects an obstacle in its direction of motion, such as a highway overpass. Based on obstacle avoidance operation 733, flight controller 720 computes flight path 723 which navigates the UAV above or below the overpass to avoid a collision. After the UAV passes the obstacle, optimization engine 722 may maintain its obstacle avoidance capability at a lower priority or as a background operation.

In other implementations, the UAV may detect a stationary or moving obstacle in the path of the UAV, such as a bird flying in the path of the UAV or even another drone surveilling the race. Obstacle avoidance operation 733 may cause the UAV to detour around the obstacle by going above or below it or to the left or the right of the obstacle depending on the obstacle's motion. Alternatively, obstacle avoidance operation 733 may cause the UAV to slow down or stop and hover until the obstacle has passed. The UAV may also implement a programmed evasive maneuver to avoid an imminent collision comprising a change in speed, direction, and/or orientation (e.g., a dive or a roll). After flight controller 720 detects that the risk of a collision is no longer present, flight controller 720 may reprioritize the other flight objectives to compute the flight path.

Programmed flight operations 710 can also include visual tracking operation 734. In an implementation, the UAV must visually track or maintain line of sight to an object as it flies a stationary position relative to the beacon. Tracking the object may require flight controller 720 to continually adjust the orientation of the UAV as it computes flight path 723, particularly if the object is also in motion and its travel is in a different direction than that of the beacon. While tracking the object is typically accomplished by data received from one or more of the onboard cameras, tracking the object may also be accomplished using other sensors of the UAV, such as radar, sonar, or thermal-imaging systems.

Programmed flight operations 710 can also include programmed maneuver 735. Programmed maneuver 735 may include a maneuver defined relative to the beacon (i.e., relative to the stationary position of the UAV relative to the beacon). For example, programmed maneuver 735 may direct the UAV to fly back and forth between positions 20 feet forward of and aft of the stationary position. In an implementation, the UAV may be further commanded to maintain line-of-sight to an object as it performs the back-and-forth flight operation as it tracks and maintains an awareness of the location of the beacon. In this way, complex flight operations can be integrated into flight path 723 by optimization engine 722. In another implementation, programmed maneuver 735 may comprise a maneuver to fly a circular pattern relative to the stationary position, resulting in the UAV orbiting the beacon as the beacon travels. Programmed maneuver 735 may also include computed spline operations wherein the UAV stores a set of keyframes and computes and flies a spline connecting the keyframes. The keyframes may be defined relative to the beacon (i.e., relative to the stationary position of the UAV relative to the beacon).

Figure 8A:
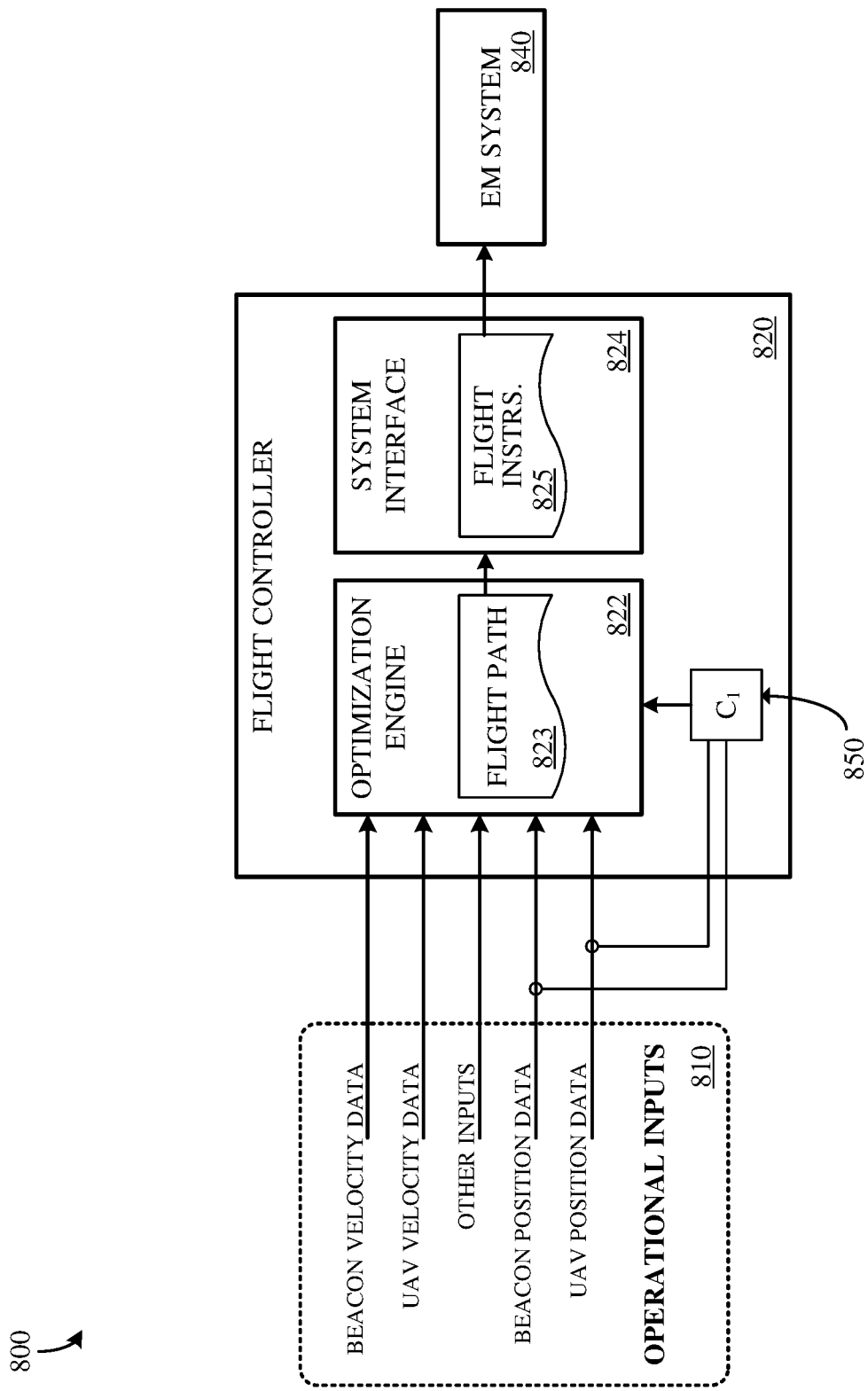
FIGS. 8A and 8B illustrate an operational architecture of a UAV in an implementation.

FIG. 8A illustrates operation architecture 800 of a flight control system of a UAV in an implementation. A UAV in flight maintains a desired position relative to a beacon in motion as controlled by flight controller 820. Flight controller 820 comprises optimization engine 822 which computes flight path 823 based at least in part on operational inputs 810. System interface 824 of flight controller 820 generates flight instructions 825 based on flight path 823 and transmits flight instructions 825 to EM system 840.

To maintain the desired position relative to the beacon, optimization engine 822 continually tracks the position of the beacon, deriving from the beacon position data the beacon's velocity and the UAV's actual position relative to the beacon. Optimization engine 822 continually monitors UAV's actual position relative to the beacon as it computes flight path 823. If the UAV's actual position is within a threshold or allowable margin of the desired position, optimization engine 822 computes flight path 823 based at least on matching or attempting to match the UAV's velocity to that of the beacon. If, however, the UAV's actual position exceeds the threshold (for example, due to an abrupt maneuver by the beacon), optimization engine 822 will compute flight path 823 based at least on navigating the UAV to the desired position. Comparator 850, which can be a circuit, logic, subroutine, module, or the like, compares the UAV's actual position to a desired position relative to the beacon based on the beacon's location data to determine whether the threshold has been exceeded. In an implementation, the output of comparator 850 may be received by optimization engine 822 as an additional input. In an alternative implementation, comparator 850 may be a part of optimization engine 822. In an implementation, comparator 850 outputs to optimization engine 822 a difference or distance between the actual and desired positions and/or an indication of whether the threshold has been exceeded.

In response to determining whether the UAV is within or beyond a threshold of the desired position based on the output of comparator 850, optimization engine 822 may actively or explicitly assign a more favorable weighting (i.e., higher priority) to inputs associated with a velocity objective (i.e., matching or attempting to match the velocity of the UAV to the velocity of the beacon) or to inputs associated with a position objective (i.e., navigating the UAV to the desired position) in computing flight path 823. In an alternative implementation, optimization engine 822 determines a computational weight scheme or prioritization scheme based on the input from comparator 850 which is then applied to the inputs to optimization engine 822. In yet another implementation, optimization engine 822 may comprise a machine learning or artificial intelligence engine which responds to operational inputs 710 and the input received from comparator 850, wherein the response is based on its training. In still another implementation, optimization engine 822 comprising a neural network may respond to the input from comparator 850 by activating or deactivating computational pathways according to the input from comparator 850. The computational pathways of the neural network comprise weights which are applied to operational inputs 810 and summed, giving rise to flight path 823.

Figure 8B:
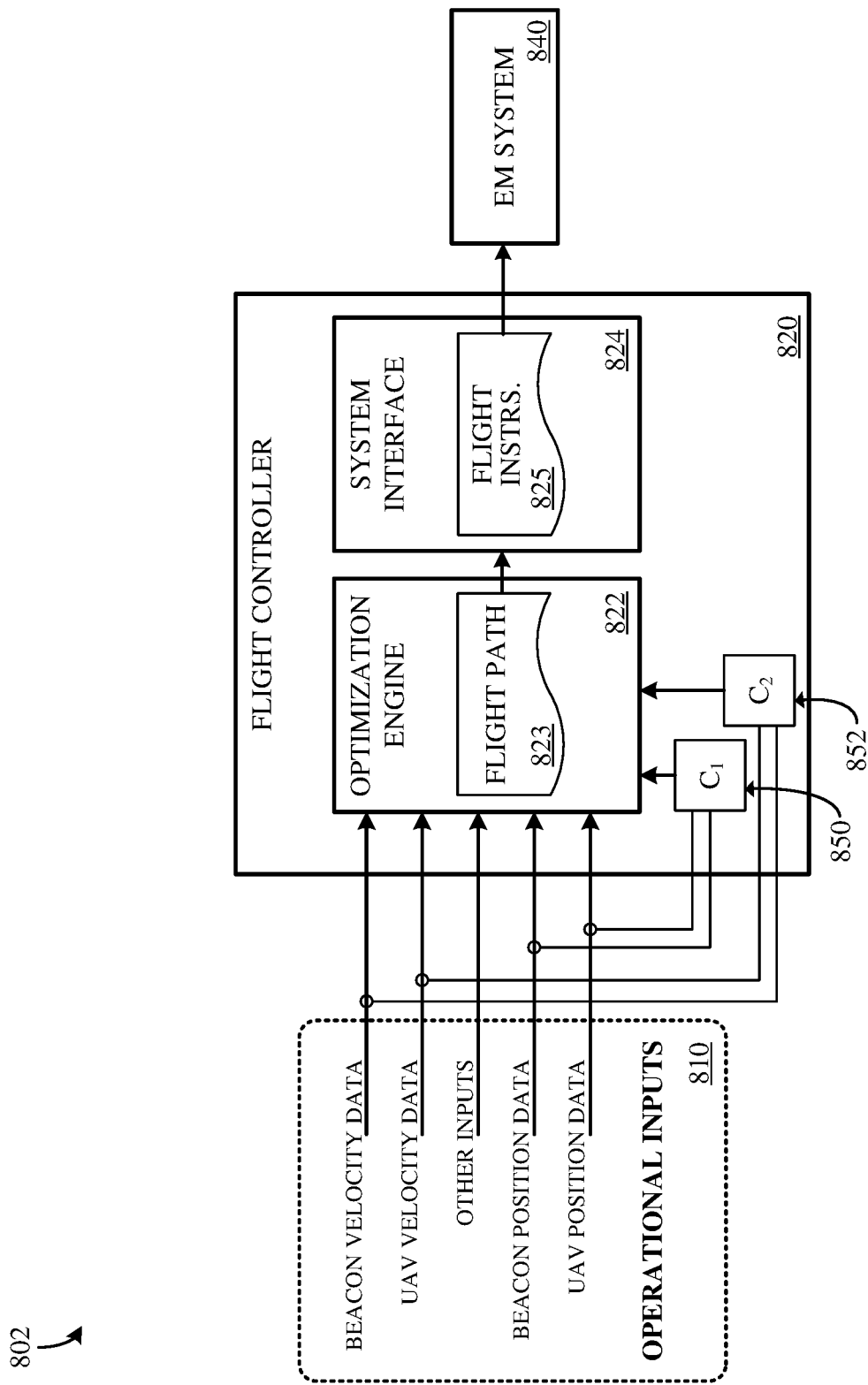

FIG. 8B illustrates operational architecture 802 of a flight control system of a UAV in an implementation. In an implementation, velocity comparator 852 determines whether the velocity of the UAV is within a threshold of the beacon velocity. Optimization engine 822 may incorporate the output of the velocity comparator 852 in assigning weights to operational inputs 810 in computing flight path 823. As in operational architecture 800, optimization engine 822 may comprise a machine learning, artificial intelligence, or other computational engine. It may be appreciated that in some implementations, velocity comparator 852 may be contained within optimization engine 822. In yet another implementation, optimization engine 822 may incorporate additional flight objectives which in turn affect the computational weighting or prioritization of operational inputs 810 in computing flight path 823. Additional flight objectives can include a visual tracking operation, an obstacle avoidance operation, a geofence response operation, a programmed flight operation, and so on.

Figure 9:
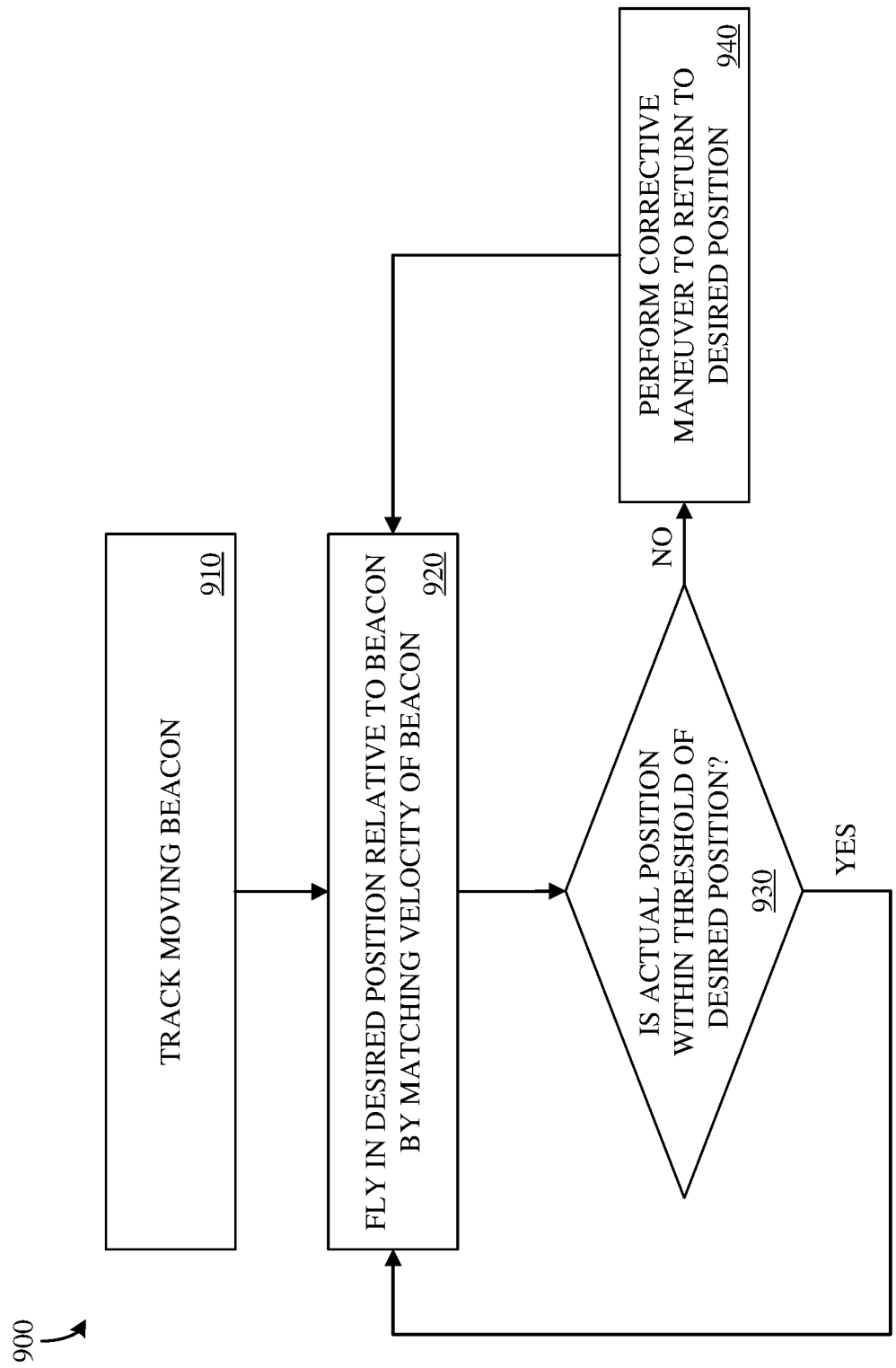
FIG. 9 illustrates a method of operating a UAV in an implementation.

FIG. 9 illustrates process 900 for operating a UAV according to the technology disclosed herein in an implementation. Process 900 is implemented in program instructions that, when executed by the one or more hardware and/or firmware elements of a flight control system onboard a UAV, such as UAV 520 or 620 of FIGS. 5A-C and 6, direct the UAV to operate as follows. A flight control system onboard the UAV receives position information for a beacon in motion, such as beacon 502 or 602 of FIGS. 5A-C and 6, such as the longitude, latitude, altitude, and timestamp data obtained from a GPS, GLONASS, or other terrestrial or satellite-based navigation system (step 910). The flight control system uses the GPS data received from the beacon to compute the velocity of the beacon as well as the position of the UAV relative to the beacon. The flight control system computes a flight path for the UAV which matches the velocity of the UAV to that of the beacon (step 920) and generates instructions for the onboard electromechanical system based on the computed flight path. As discussed herein, phrases such as "matches the velocity of the beacon" refer to attempts to match the velocity of the beacon and can include minor variations, i.e., the velocities will be matched within a margin of error. The computed flight path also may incorporate other inputs, such as flight command issued from a remote control, in various implementations. For example, as the UAV tracks and maintains its position relative to the beacon, the pilot may issue flight commands to obtain a particular view from an onboard camera by adjusting the orientation (e.g., pitch and/or yaw angles) of the UAV. In other implementations, the computed flight path also incorporates input relating to the atmospheric or environmental conditions, such as wind speed and direction. The computed flight path may also incorporate forecasts or extrapolations of the movement of the beacon produced by regression techniques or artificial intelligence or machine learning models.

As the UAV is in flight, the flight control system continually ascertains its position relative to the beacon. In an implementation, the flight control system computes the error between the UAV's actual position relative to the beacon and its desired position. If the error exceeds a threshold amount or as the error increases, this triggers a modification to the computation of the flight path, whereby regaining the desired position is prioritized. Thus, if/when the flight control system detects that the UAV has strayed from its desired position relative to the beacon (step 930), the flight control system will compute a corrective maneuver to reposition the UAV at its desired position relative to the beacon (step 940). This may be implemented, for example, by an optimization calculation which downgrades the velocity-matching objective of the computation and prioritizes a positioning objective of the computation. Alternatively, the flight control system may pause the velocity-matching operation and execute only the position-matching operation. In yet another implementation, the corrective maneuver may be calculated by a machine learning algorithm which optimizes a flight path based on the actual flight parameters of the UAV and the desired objectives, of which maintaining the desired position relative to the beacon is one objective. When the flight control system determines that the UAV is at its desired position relative to the beacon, it resumes maintaining that position in flight by matching the velocity of the beacon (step 920), checking its relative position, and incorporating other inputs.

In an implementation, an unmanned aerial vehicle comprises a flight control system and an electromechanical system coupled with the flight control system and configured to fly the unmanned aerial vehicle as directed by the flight control system, wherein the flight control system is configured to at least: track a beacon that is in motion, and fly the unmanned aerial vehicle to maintain a desired position relative to the beacon by at least: directing the electromechanical system to maneuver the unmanned aerial vehicle such that a velocity of the unmanned aerial vehicle matches a velocity of the beacon; when an actual position of the unmanned aerial vehicle, relative to the beacon, drifts at least a threshold amount from the desired position, directing the electromechanical system to perform a corrective maneuver that returns the actual position of the unmanned aerial vehicle to the desired position relative to the beacon; and upon the unmanned aerial vehicle returning to the desired position, resume directing the electromechanical system to maneuver the unmanned aerial vehicle such that the velocity of the unmanned aerial vehicle matches the velocity of the beacon.

In an implementation, an unmanned aerial vehicle comprises a flight control system and an electromechanical system coupled with the flight control system and configured to fly the unmanned aerial vehicle as directed by the flight control system, wherein the flight control system is configured to at least: track a beacon that is in motion, and fly the unmanned aerial vehicle to maintain a desired position relative to the beacon by at least: directing the electromechanical system to maneuver the unmanned aerial vehicle to attempt to match a velocity of the unmanned aerial vehicle to a velocity of the beacon; when an actual position of the unmanned aerial vehicle, relative to the beacon, drifts at least a threshold amount from the desired position, directing the electromechanical system to perform a corrective maneuver that returns the actual position of the unmanned aerial vehicle to the desired position relative to the beacon; and upon the unmanned aerial vehicle returning to the desired position, resume directing the electromechanical system to maneuver the unmanned aerial vehicle to attempt to match the velocity of the unmanned aerial vehicle to the velocity of the beacon.

In an implementation, an unmanned aerial vehicle comprises a flight control system and an electromechanical system coupled with the flight control system and configured to fly the unmanned aerial vehicle as directed by the flight control system, wherein the flight control system is configured to at least: track a beacon that is in motion, and fly the unmanned aerial vehicle to maintain a desired position relative to the beacon by at least: directing the electromechanical system to maneuver the unmanned aerial vehicle to minimize a first difference between a velocity of the unmanned aerial vehicle and a velocity of the beacon and to minimize a second difference between an actual position of the UAV relative to the beacon and the desired position relative to the beacon, according to a relative priority of each of the first and second differences; when the actual position of the unmanned aerial vehicle, relative to the beacon, drifts at least a threshold amount from the desired position, directing the electromechanical system to perform a corrective maneuver that returns the actual position of the unmanned aerial vehicle to the desired position relative to the beacon, wherein the corrective maneuver comprises a change in the relative priorities of the first and second differences; and upon the unmanned aerial vehicle returning to the desired position, resume directing the electromechanical system to maneuver the unmanned aerial vehicle to minimize the first difference and to minimize the second difference according to the relative priorities of the first and second differences. As the flight control system of the UAV flies the UAV to maintain the desired position, the relative priority of the first difference is greater than the relative priority than the second difference, and when the actual position of the unmanned aerial vehicle drifts at least a threshold amount from the desired position, the relative priority of the second difference is greater than the relative priority of the first difference.

In an implementation, an unmanned aerial vehicle comprises a flight control system and an electromechanical system coupled with the flight control system and configured to fly the unmanned aerial vehicle as directed by the flight control system, wherein the flight control system is configured to at least: track a beacon that is in motion, and fly the unmanned aerial vehicle to maintain a desired position relative to the beacon by at least: directing the electromechanical system to maneuver the unmanned aerial vehicle by at least prioritizing a relative velocity of the unmanned aerial, with respect to a velocity of the beacon, over a relative position of the unmanned aerial vehicle with respect to a position of the beacon; when the relative position of the unmanned aerial vehicle drifts at least a threshold amount beyond the position of the beacon, directing the electromechanical system to maneuver the unmanned aerial vehicle by at least prioritizing the relative position of the unmanned aerial vehicle over the relative velocity of the unmanned aerial. The UAV performs a corrective maneuver that returns the actual position of the unmanned aerial vehicle to the desired position relative to the beacon; upon the unmanned aerial vehicle returning to the desired position, resume directing the electromechanical system to maneuver the unmanned aerial vehicle such that the velocity of the unmanned aerial vehicle matches the velocity of the beacon.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

In various implementations, the systems, methods, processes, and operational scenarios may be implemented in computer software executed by a processing system in the context of an unmanned aerial vehicle, a remote-control device, or any other type of device capable of executing software such as computers and mobile phones. The processing system may load and execute the software from a storage system or may be pre-configured with the software. The software includes and implements a process for creating a flight path, which is representative of the flight path creation processes discussed with respect to the preceding Figures, such as processes 200 and 900 and operational architectures 700, 800, and 802. When executed by processing system, the software directs the processing system to operate as described herein for at least the various processes, operational scenarios, and sequences discussed in the foregoing implementations.

Exemplary processing system may comprise a microprocessor and other circuitry that retrieves and executes software from storage. The processing system may be implemented within a single processing device but may also be distributed across multiple processing devices or sub-systems that cooperate in executing program instructions. Examples of processing systems include general purpose central processing units, graphical processing units, application specific processors, and logic devices, as well as any other type of processing device, combinations, or variations thereof.

An exemplary storage system may comprise any computer readable storage media readable by a processing system and capable of storing software. The storage system may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

The software may be implemented in program instructions and among other functions may, when executed by a processing system, direct the processing system to operate as described with respect to the various operational scenarios, sequences, and processes illustrated herein. In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. The software may include additional processes, programs, or components, such as operating system software, virtualization software, or other application software. The software may also comprise firmware or some other form of machine-readable processing instructions executable by a suitable processing system.

In general, the software may, when loaded into a processing system and executed, transform a suitable apparatus, system, or device overall from a general-purpose computing system into a special-purpose computing system as described herein. Encoding the software on a storage system may transform the physical structure of the storage system. The specific transformation of the physical structure may depend on various factors in different implementations of this description. Examples of such factors may include, but are not limited to, the technology used to implement the storage media of the storage system and whether the computer-storage media are characterized as primary or secondary storage, as well as other factors.

For example, if the computer readable storage media are implemented as semiconductor-based memory, the software may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

It may be further appreciated that the unmanned aerial vehicles, remote-control devices, or other devices in which aspects of the present invention may be embodied, may include a communication interface system. The communication interface system may include communication connections and devices that allow for communication with other computing systems and devices over communication networks. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between such systems and devices may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

The unmanned aerial vehicles, remote-control devices, or other devices in which aspects of the present technology may be embodied, may include a user interface system. A user interface system may any one or more of a joystick, a keyboard, a mouse, a voice input device, a touch input device for receiving a touch gesture from a user, a motion input device for detecting non-touch gestures and other motions by a user, and other comparable input devices and associated processing elements capable of receiving user input from a user (e.g., joystick toggles). Output devices such as a display, speakers, haptic devices, and other types of output devices may also be included in the user interface system. In some cases, the input and output devices may be combined in a single device, such as a display capable of displaying images and receiving touch gestures. The aforementioned user input and output devices are well known in the art and need not be discussed at length here. The user interface system may also include associated user interface software executable by a suitable processing system in support of the various user input and output devices discussed above. Separately or in conjunction with each other and other hardware and software elements, the user interface software and user interface devices may support a graphical user interface, a natural user interface, or any other type of user interface.

Unless the context clearly requires otherwise, throughout the description and the claims, the words "comprise," "comprising," "such as," and "the like" are to be construed in an inclusive sense, as opposed to an exclusive or exhaustive sense, that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having operations, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. An unmanned aerial vehicle comprising:
a flight control system comprising program instructions which direct the flight control system to compute flight instructions for an electromechanical system of the unmanned aerial vehicle, wherein to compute the flight instructions, the program instructions direct the flight control system to:
track a position of a beacon that is in motion;
monitor a difference between an actual position of the unmanned aerial vehicle and a desired position of the unmanned aerial vehicle relative to the position of the beacon;
monitor an error between an actual velocity of the unmanned aerial vehicle and a velocity of the beacon; and
determine a computational weighting of flight objectives for computing the flight instructions, wherein the computational weighting is based at least on whether the difference between the actual position and the desired position exceeds a threshold, the error between the actual velocity and the velocity of the beacon, and a rate of change of the error, and wherein the flight objectives comprise a velocity objective and a position objective, wherein the velocity objective comprises matching the actual velocity to the velocity of the beacon; and
command the electromechanical system based at least on the flight instructions; and
the electromechanical system, wherein the electromechanical system maneuvers the unmanned aerial vehicle based on the flight instructions from the flight control system.

2. The unmanned aerial vehicle of claim 1, wherein to determine the computational weighting of the flight objectives for computing the flight instructions, the program instructions direct the flight control system to favor the position objective of the flight objectives over the velocity objective of the flight objectives when the difference between the actual position and the desired position exceeds the threshold.

3. The unmanned aerial vehicle of claim 2, wherein to determine the computational weighting of the flight objectives for computing the flight instructions, the program instructions direct the flight control system to favor the velocity objective over the position objective when the difference between the actual position and the desired position does not exceed the threshold.

4. The unmanned aerial vehicle of claim 3, wherein the program instructions further direct the flight control system to calculate a flight path for the unmanned aerial vehicle based on inputs associated with the flight objectives and generate instructions for the electromechanical system to maneuver the unmanned aerial vehicle according to the flight path.

5. The unmanned aerial vehicle of claim 4, wherein:
to favor the velocity objective of the flight objectives over the position objective of the flight objectives, the program instructions direct the flight control system to weight the inputs such that inputs associated with the velocity objective are given greater weight than inputs associated with the position objective, wherein the inputs associated with the velocity objective include the actual velocity of the unmanned aerial vehicle and the velocity of the beacon and wherein the inputs associated with the position objective include the actual position of the unmanned aerial vehicle and the desired position; and
to favor the position objective over the velocity objective, the program instructions direct the flight control system to weight the inputs such that inputs associated with the position objective are given greater weight than relative to the inputs associated with the velocity objective.

6. The unmanned aerial vehicle of claim 4, wherein one of the one or more flight objectives comprises user input from a controller remote from the unmanned aerial vehicle, wherein the user input comprises a flight command relating to the flight path of the unmanned aerial vehicle.

7. The unmanned aerial vehicle of claim 4, wherein one of the one or more flight objectives comprises a geofence, wherein the geofence indicates a boundary of a no-fly zone.

8. A method of operating an unmanned aerial vehicle comprising a flight control system and an electromechanical system coupled with the flight control system, wherein the method comprises:
the flight control system computing flight instructions for an electromechanical system of the unmanned aerial vehicle, wherein computing the flight instructions comprises:
tracking a position of a beacon that is in motion;
monitoring a difference between an actual position of the unmanned aerial vehicle and a desired position of the unmanned aerial vehicle relative to the position of the beacon;
monitor an error between a velocity of the unmanned aerial vehicle and a velocity of the beacon;
determining a computational weighting of flight objectives for computing the flight instructions, wherein the computational weighting is based at least on whether the difference between the actual position and the desired position exceeds a threshold, the error between the velocity of the unmanned aerial vehicle and the velocity of the beacon, and a rate of change of the error, and wherein the flight objectives comprise a velocity objective and a position objective, and wherein the velocity objective comprises matching the velocity of the unmanned aerial vehicle to the velocity of the beacon; and
commanding the electromechanical system based at least on the one or more flight objectives; and
the electromechanical system maneuvering the unmanned aerial vehicle based on the flight instructions from the flight control system.

9. The method of claim 8, wherein determining the computational weighting of the flight objectives for computing the flight instructions comprises favoring the position objective over the velocity objective when the difference between the actual position and the desired position exceeds the threshold.

10. The method of claim 9, wherein determining the computational weighting of the flight objectives for computing the flight instructions comprises favoring the velocity objective over the position objective when the difference between the actual position and the desired position does not exceed the threshold.

11. The method of claim 8, wherein the flight control system comprises an optimization engine, and wherein the method further comprises:
the optimization engine calculating a flight path for the unmanned aerial vehicle based on inputs associated with the flight objectives; and the flight control system generating the flight instructions for the electromechanical system to maneuver the unmanned aerial vehicle according to the flight path.

12. The method of claim 11, wherein favoring the velocity objective over the position objective comprises weighting the inputs to the optimization engine such that the inputs associated with the velocity objective are given greater weight than inputs associated with the position objective, wherein the inputs associated with the velocity objective comprise the error between the actual velocity of the unmanned aerial vehicle and the velocity of the beacon and wherein the inputs associated with the position objective comprise the difference between the actual position and the desired position.

13. The method of claim 12, wherein favoring the position objective over the velocity objective comprises weighting the inputs to the optimization engine such that the inputs associated with the position objective are given greater weight than the inputs associated with the velocity objective.

14. The method of claim 13, wherein one of the flight objectives further comprises a geofence objective, wherein the geofence objective indicates a boundary of a no-fly zone.

15. A computing apparatus comprising:
one or more computer readable storage media having program instructions stored thereon that, when executed by one or more processors of a flight control system on-board an unmanned aerial vehicle, direct the flight control system to at least:
track a position of a beacon that is in motion;
monitor a difference between an actual position of the unmanned aerial vehicle and a desired position of the unmanned aerial vehicle relative to the position of the beacon;
monitor an error between an actual velocity of the unmanned aerial vehicle and a velocity of the beacon;
determine a computational weighting of flight objectives for computing flight instructions, wherein the computational weighting is based at least on whether the difference between the actual position and the desired position exceeds a threshold, the error between the actual velocity and the velocity of the beacon, and wherein the flight objectives comprise a velocity objective and a position objective, and wherein the velocity objective comprises matching the actual velocity to the velocity of the beacon; and
generate flight instructions for an electromechanical system of the unmanned aerial vehicle based at least on the flight objectives and the computational weighting.

16. The computing apparatus of claim 15, wherein to select the computational weighting of the flight objectives for computing the flight instructions, the program instructions direct the flight control system to favor the position objective over the velocity objective when the difference between the actual position and the desired position exceeds the threshold.

17. The computing apparatus of claim 16, wherein to select the computational weighting of the flight objectives for computing the flight instructions, the program instructions direct the flight control system to favor the velocity objective over the position objective when the difference between the actual position and the desired position does not exceed the threshold.

18. The computing apparatus of claim 17, wherein the program instructions further direct the flight control system to calculate a flight path for the unmanned aerial vehicle based on inputs associated with the flight objectives.

19. The computing apparatus of claim 18, wherein, to favor the velocity objective over the position objective, the program instructions direct the flight control system to weight the inputs such that the inputs associated with the velocity objective are given greater weight than inputs associated with the position objective, wherein the inputs associated with the velocity objective comprise the error between the actual velocity of the unmanned aerial vehicle and the velocity of the beacon and wherein the inputs associated with the position objective comprise the difference between the actual position and the desired position.

20. The computing apparatus of claim 19, wherein to favor the position objective over the velocity objective, the program instructions direct the flight control system to weight the inputs such that inputs associated with the position objective are given greater weight than the inputs associated with the velocity objective.

* * * * *